(12) United States Patent
Uehara et al.

(10) Patent No.: US 7,411,640 B2
(45) Date of Patent: Aug. 12, 2008

(54) IMAGE DISPLAY DEVICE AND PORTABLE TERMINAL DEVICE USING THE SAME

(75) Inventors: Shin-ichi Uehara, Tokyo (JP); Nobuaki Takanashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/870,823

(22) Filed: Oct. 11, 2007

(65) Prior Publication Data
US 2008/0037121 A1 Feb. 14, 2008

Related U.S. Application Data

(62) Division of application No. 10/787,144, filed on Feb. 27, 2004, now Pat. No. 7,301,587.

(30) Foreign Application Priority Data
Feb. 28, 2003 (JP) ............................. 2003-054340

(51) Int. Cl.
*G02F 1/1335* (2006.01)
*G02B 27/10* (2006.01)
(52) U.S. Cl. ............................ 349/95; 349/15; 349/113; 349/114; 359/621; 359/622; 359/623
(58) Field of Classification Search .................. 349/95
See application file for complete search history.

(56) References Cited

U.S. PATENT DOCUMENTS 5,566,007 A * 10/1996 Ikeda et al. .................... 349/5

| 5,731,857 A | 3/1998 | Neijzen |
| 6,172,723 B1 * | 1/2001 | Inoue et al. .................... 349/95 |
| 6,765,638 B1 | 7/2004 | Masuzawa |

FOREIGN PATENT DOCUMENTS

| JP | 6-332354 A | 12/1994 |
| JP | 8-184846 A | 7/1996 |
| JP | 2001-075049 A | 3/2001 |
| JP | 2002-174852 A | 6/2002 |
| JP | 2002-323612 A | 11/2002 |

OTHER PUBLICATIONS

Chihiro Masuda, Sangyo Tosho K.K. "Three Dimensional Display", first page.

* cited by examiner

*Primary Examiner*—Michael H Caley
(74) *Attorney, Agent, or Firm*—Sughrue Mion, PLLC

(57) ABSTRACT

In a display panel, a plurality of pixel sections are arranged in the form of a matrix. Each of the pixel sections includes a pixel for displaying an image for the left eye and a pixel for displaying an image for the right eye. Lenticular lens having repeated convex surfaces is disposed in front of the display panel to deflect the light emitted from each pixel in the horizontal direction from the pixel for displaying the image for the left eye to the pixel for displaying the image for the right eye in each pixel section. Reflection plate reflects the exterior light toward the display panel and has surface projections on the surface. In this case, the focal distance f of the lens is different from the distance H between the surface of the reflection plate and the apex of the lens.

32 Claims, 24 Drawing Sheets

θ=75°

θ=65°

θ=60°

θ=50°

θ=35°

θ=25°

IMAGE DISPLAY DEVICE AND PORTABLE TERMINAL DEVICE USING THE SAME

BACKGROUND OF THE INVENTION

1. Technical Field of the Invention

The present invention relates to an image display device which uses a lens such as a lenticular lens or a fly-eye lens and can display images respectively directed to plural viewpoints and to a portable terminal device using the image display device. More specifically, the present invention relates to an image display device which has an excellent display quality without any brightness reduction in the reflection display mode and to a portable terminal device using the image display device.

2. Description of the Related Art

Since the distant past, various investigations have been made on a display device capable of displaying a three-dimensional image. Regarding the binocular vision, the Greek mathematician, Euclid, stated in 280 B.C. that "the binocular vision is a visual perception which a person can be obtained, simultaneously watching with his own left and right eyes two different images which are obtained by looking at a single object from different directions" (see, for example, Non-patent literature 1: "Three-Dimensional Display" written by Chihiro Masuda, Sangyo Tosho, K. K.). That is, the three-dimensional image display device is required in its function to provide two images having a parallax different from each other for the left and right eyes.

In the past, a greater number of three-dimensional image display methods were studied in order to actually realize such a function. The methods can generally be classified into those requiring to use eyeglasses and those requiring not to use eyeglasses. The anaglyph method using the color difference, and the polarized eyeglasses method using the polarization pertain to the method requiring using eyeglasses. Because it is substantially difficult to avoid troublesome resulting from the usage of eyeglasses, the methods requiring un-using eyeglasses have been mostly studied in the recent years.

The lenticular lens method, and the parallax barrier method and the like pertain to the method requiring un-using eyeglasses. The lenticular lens method was invented in 1910 or so by Ives et al. The parallax barrier method was envisaged by Berthier in 1896, and actually demonstrated by Ives in 1903.

The lenticular lens method was invented in 1910 or so by Ives et al., as described in the non-patent literature 1. FIG. 1 is a perspective view of a lenticular lens 121, and FIG. 2 is a diagram showing the optical model in a three-dimensional display method, using the lenticular lens. As shown in FIG. 1, the lenticular 121 has a flat plane on one side, and a plurality of hog-backed convex portions (cylindrical lenses) 122 extending in a direction, i.e., parallel to each other in the longitudinal direction on the other side.

As shown in FIG. 2, the lenticular lens 121, a display panel 106 and a light source 108 are arranged in this order from the side of an observer. A display panel 106 is disposed in the focal plane of the lenticular lens 121. In the display panel 106, pixels 123 for displaying an image for the right eye 141 and pixels 124 for displaying an image for the left eye 142 are alternately arranged. In this case, a group of the pixels 123 and pixels 124 adjacent to each other pertains to each convex portion 122 of the lenticular lens 121. As a result, the light, which is emitted from the light source 108 and then passes through each pixel, is deflected into two directions toward the left and right eyes by the convex portions 122 of the lenticular lens 121, so that images different from each other can be detected with the left and right eyes, thereby enabling a three-dimensional image to be detected by the observer.

On the other hand, the parallax barrier method was envisaged by Berthier in 1896 and later demonstrated by Ives in 1903. FIG. 3 is an optical model in a three-dimensional image display method, using a parallax barrier. As shown in FIG. 3, the parallax barrier 105 is regarded as a barrier (light shield) having a number of fine stripe-shaped openings, i.e., slits 105a. In this case, a display panel 106 is disposed in the vicinity of one side of the parallax barrier 105. In the display panel 106, pixels 123 for the right eye and pixels 124 for the left eye are arranged in a direction perpendicular to the longitudinal direction of the slit. In this case, a light source 108 is disposed in the vicinity of the other side of the parallax barrier 105, i.e., on the side opposite to the display panel 106.

The light, which is emitted from the light source 108, and then passes through the openings (slits 105a) of the parallax barrier 105 and further passes through the pixels 123 for the right eye, becomes a light flux 181. Similarly, the light, which emitted from the light source 108, and then passes through slits 105a, and further passes through the pixels 124 for the left eye, becomes a light flux 182. In this case, the position from which an observer is able to detect a three-dimensional image is determined by the positional relationship between the parallax barrier 105 and the pixels. In other words, it is necessary to position the right eye 141 of the observer within an area through which all the light fluxes 181 for the pixels 123 for the right eye pass, as well as to position the left eye 142 of the observer an area through which all the light fluxes 182 pass. This relationship can be realized in the case when the midpoint 143 between the observer's right eye 141 and left eye 142 is located within a rectangular three-dimensional visible range 107, as shown in FIG. 3. Among line segments extending in the arrangement direction of the pixels 123 for the right eye and pixels 124 for the left eye, the line segment passing the intersection 107a of diagonal lines perpendicular to each other in the three-dimensional visible range 107 is the longest line segment. Accordingly, when the midpoint 143 coincides with the intersection 107a, the maximum latitude is obtained in the deviation of the observer's position in the horizontal direction, so that such a condition provides the most favorable observing position. In the three-dimensional image display method, therefore, the distance between the intersection 107a and the display panel 106 is regarded as an optimal observation distance OD, and it is recommended for the observer to observe the display in this distance. A virtual flat plane, which is positioned at the optimal observation position OD from the display panel 106 in the three-dimensional visible range 107, is denoted by an optimal observation plane 107b. Under this condition, the light emitted from the pixels 124 for the right eye and the light emitted from the pixels 124 for the left eye arrive at the right eye 141 and the left eye 142 of the observer, respectively. As a result, the observer is able to recognize an image displayed on the display panel 106 as a three-dimensional image.

In the parallax barrier method early envisaged, a parallax barrier is interposed between the pixels and the observer's eyes, and therefore provides an eyesore so that the visibility is reduced. However, in the recent development of the liquid crystal display device, it is possible to dispose a parallax barrier 105 on the rear side of a display panel 106, as shown in FIG. 3, so that the visibility is improved. At present, extensive studies are carried out on the three-dimensional image display device, using the parallax barrier method.

However, the parallax barrier method is used as a method in which undesirable light rays are "hidden" by the barrier, whereas the lenticular lens method is used as a method in which the proceeding direction of light is altered. As a result, the lenticular lens method provides an advantage that the brightness on the display screen is not principally reduced. In view of this fact, an extensive study is made on the application of the lenticular lens method to a portable device which particularly requiring an increase in the brightness of the display and a reduction in the electric power consumption. In conjunction with the above, a transmissive liquid crystal display device is used as a display panel in a three-dimensional image display device using a conventional lenticular lens.

Besides the three-dimensional image display device, a display for simultaneously displaying plural images has been developed as an image display device using a lenticular lens (see Japanese Patent Laid-Open Publication No. H06(1994)-332354 (FIG. 20) referred to as Patent literature 1). This display simultaneously displays images different from one another in the direction of observation under the same conditions using the image distribution capability of a lenticular lens. This single display device can provide a plurality of observers, positioned in different directions with respect to the display device, with images different from one another. The patent literature 1 describes that the use of this display device can reduce the required set-up space and the power rate as compared with a case of using ordinary single-image display devices by the number of images to be displayed.

Up to this time, studies have been made on a reflective two-dimensional image display device having a reflection plate used in a display panel. In the reflective display device, the light entering from the outside is reflected by a reflector positioned inside the display device. In this case, the reflected light is used as a light source for display, so that it is necessary to use neither backlight nor side light as the light source. A transmissive display device, on the other hand, requires either backlight or side light as a light source. Using a reflective display device in a display panel can therefore achieve low power consumption as compared with the case of using the transmissive display device. In this respect, recently, active attempts have been made to adapt the reflective display device to portable devices or so.

However, in the case when such a reflective display device is used, the flat plane of the reflection plate reflects the exterior light as if it is a mirror, and therefore the other light source, such as a fluorescent light is imaged thereon, so that quality of display is deteriorated. Moreover, as for an observer, only the light incident from a specific angle contributes to the display, thereby causing the efficiency in using the exterior light to be reduced.

In order to eliminate such a problem, a technique in which a reflection plate is provided with a number of surface projections was proposed, as described in Japanese Patent Laid-Open Publication No. H08(1996)-184846 (Patent literature 2). FIG. 4 shows an example of a reflection plate having such surface projections. In this case, an organic film is deposited onto the reflection plate 4, and such surface projections 41 are formed on the under layer of the reflection plate 4 by forming projections on the surface of the organic film. In accordance with the profile of the surface projections, the exterior light entering the reflection plate in a specific direction is reflected, and then diffused in various directions. In this case, the exterior light entering in various directions is also reflected toward an observer. As a result, the exterior light proceeding in various directions can be effectively used in the display by preventing the light source from imaging thereon.

Thus, both the three-dimensional image display device using a lenticular lens and the reflective two-dimensional display device have already been known in the technical field concerned.

Although the three-dimensional image display device using such a lenticular lens and the reflective two-dimensional display device have an advantage that a greater amount of reduction in the electric power consumption is attained, there exists no three-dimensional image display device, which is produced by combining the above two members with each other.

In view of this fact, the present inventors extensively studied such a combination of a three-dimensional image display device using a lenticular lens and a reflective two-dimensional display device, which combination makes it possible to realize a three-dimensional image display obtained in the reflection display mode, along with reduced electric power consumption. The result obtained reveals the following new problem.

In the three-dimensional visible range, which has been designed so as to exhibit substantially uniform brightness, the brightness in the display is reduced in several areas, depending on the observing position. At a shifted position where the brightness decreases, dark areas are discerned in the display, and a pattern of dark lines is observed in some cases. As a result, quality of a three-dimensional image display is deteriorated by the unevenness in the brightness.

Before discussing this problem, firstly a three-dimensional image display device using both a conventional transmissive liquid crystal display panel and a lenticular lens is described. FIG. 5 is a perspective view of a dual eye type three-dimensional image display device. A cylindrical lens constituting a lenticular lens 3 is disposed in conformity to two pixels (pixel 51 for the left eye, pixel 52 for the right eye) in a display panel 2. As shown in FIG. 6, the light emitted from the pixel 51 for the left eye or the pixel 52 for right eye of the display panel is refracted by the lenticular lens 3, and travels toward an area EL or ER. If, therefore, an observer places his own left eye 61 on the area EL and his own right eye 62 on the area ER, an image for the left eye can be detected with the left eye 61 and an image for the right eye can be detected with the right eye 62, thereby enabling a three-dimensional image to be observed.

Moreover, the size of substantial components in the three-dimensional image display device using the lenticular lens will be described, with the aid of the optical model shown in FIG. 7. In this case, it is assumed that the distance between the display pixel and the center of the convex portion on the surface of the lenticular lens 3 is H and the refraction index of the lenticular lens 3 is n. The center of the convex portion on the surface of the lenticular lens 3 implies the apex of the lenticular lens 3. One side of the lenticular lens 3 is a flat plane, and on the other side is convex cylindrical lenses each having a convex portion, that is, a number of hog-backed convex portions 31 extending in a direction are disposed. Furthermore, it is assumed that the focal distance of the lenticular lens 3 is f and the lens pitch is L. The pixels of the display panel 2 are disposed in a pair of a pixel 51 for the left eye and a pixel 52 for the right eye, where the pitch of the pixels is P. A pair of two pixels, i.e., the pixel 51 for left eye and the pixel 52 for the right eye pertains to a single convex portion 31. In this case, it is assumed that the distance between the lenticular lens 3 and the observer is OD, and that the expanded projection width of a pixel at the distance DC, i.e., the width of each projected image of the pixel 51 for the left eye or the pixel 52 for the right eye on a virtual plane which is parallel to the lens and is away therefrom by the distance OD is e. Moreover, it is assumed that the distance between the center of the convex portion 31 located at the center of the lenticular lens 3 and the center of the convex portion 31 located at the lateral end of the lenticular lens 3 is $W_L$, and the distance between the center of the pair of the pixel 51 for the left eye and the pixel 52 for the right eye disposed at the center of the display panel 2 and the center of the pair of the pixels located at the lateral end of the display panel 2 is $W_P$. Furthermore, the incident angle and exit angle of light in the convex portion 31 located at the center of the lenticular lens 3 are denoted by α an β, respectively, and the incident angle and exit angle of light in the convex portion 31 located in the lateral end of the lenticular lens 3 are denoted by γ and δ, respectively. The difference between the distance $W_L$ and the distance $W_P$ is expressed as C and the number of pixels within the area of the distance $W_P$ is expressed as 2 m.

Normally, the lenticular lens is designed in conformity to the display panel in most cases, so that the pitch P is regarded as a constant value. The refraction index n is determined by selecting the material of the lenticular lens, whereas the distance OD between the lens and the observer and the expanded projection width e of the pixel at the observation distance OD are specified respectively in predetermined values. Using these parameters, the distance H between the lens surface and the pixel and the lens pitch L are determined. From Snell's laws of refraction, the following expressions 1 to 6 hold, and from the geometrical relationship, the following expressions 7 to 9 hold:

$n \cdot \sin \alpha = \sin \beta$ (Expression 1)

$OD \cdot \tan \beta = e$ (Expression 2)

$H \cdot \tan \alpha = P$ (Expression 3)

$N \cdot \sin \gamma = \sin \delta$ (Expression 4)

$H \cdot \tan \gamma = C$ (Expression 5)

$OD \cdot \tan \delta = W_L$ (Expression 6)

$W_P - W_L = C$ (Expression 7)

$W_P = 2mP$ (Expression 8)

$W_L = mL$ (Expression 9)

From expressions 1, 2 and 3, the following expressions 10, 11 and 12 can be derived:

$\delta = \arctan(e/OD)$ (Expression 10)

$\alpha = \arctan(1/n \cdot \sin \beta)$ (Expression 11)

$H = P/\tan \alpha$ (Expression 12)

From expressions 6 and 9, the following expression 13 can be derived, and from expressions 7 to 9, the following expression 14 can be derived. Moreover, from expression 5, the following expression 15 can be derived:

$\delta = \arctan(mL/OD)$ (Expression 13)

$C = 2mP - mL$ (Expression 14)

$\gamma = \arctan(C/H)$ (Expression 15)

In this case, generally, the distance H between the pixel and the center of the convex portion on the surface of the lenticular lens is set equal to the focal distance f, as indicated in the following expression 16, so that the curvature radius r of the lens can be determined by the following expression 17:

$f = H$ (Expression 16)

$r = H \cdot (n-1)/n$ (Expression 17)

Using a light ray tracking simulator which is obtainable on the market, computer simulations for a three-dimensional image display device were carried out on the basis of the above deign concept. FIG. 8 is an optical model of the three-dimensional image display used in the simulation. In this example, it is assumed that a display panel having a pixel pitch P of 0.24 mm is used and polymethylmethacrylate (PMMA) having a refraction index n of 1.49 is used for the material of the lenticular lens 3 under the conditions: the distance OD between the lens and the observer is 280 mm; the expanded projection width of the pixel at the distance OD is 65 mm, and m is 60. Then, it can be recognized that the distance H between the lens surface and the pixel is 1.57 mm; the focal distance f of the lens is 1.57 mm; the lens pitch L is 0.4782 mm and the curvature radius r of the lens is 0.5161 mm. From these parameters, it follows that the light reception surface 18 is located at a position away from the lens surface by 280 mm. Moreover, as a pixel pitch P is equal to 0.24 mm, the width of the pixel is 0.24 mm. A light emission area 17 was disposed in the center portion of the pixel. The width of the light emission area 17 was set to 0.186. Therefore, a non-display area having a width of 0.027 mm is disposed on either side of the light emission area 17. The light emitted from the light emission area 17 was diffused light. The non-display area is equivalent to a light shield section, which is used for preventing the color mixing in the display device as well as for transmitting display signals to the pixels. Moreover, in order to simplify the simulation, the calculation was made for only a pixel for the right eye, which is located in the vicinity of the center of the display panel.

FIG. 9 is a graph showing the result of a simulation, where the abscissa means the observing position on an observation plane which is away from the lens surface by a distance OD=280 mm and the ordinate means the illuminance at the observing position. It is found that the illuminance is high in an observing position range from −60 mm to 0 mm and the magnitude of illuminance is approximately constant within the range. That is, if the right eye is positioned within such a range, the right eye receives the light having a sufficient intensity, but the left eye can hardly receive light. This implies that, when an image for the left eye is displayed on a pixel for the left eye and when an image for the right eye is displayed on a pixel for the right eye in an actual three-dimensional image display device, the left eye receives the image for the left eye and the right eye receives the image for the right eye along with a sufficient image separation, thereby enabling a three-dimensional image to be detected by an observer.

Next, a computer simulation was carried out as for a reflective three-dimensional image display device wherein light emitting areas for pixels are disposed in a reflection plate. FIG. 10 is a diagram showing the optical model used in the simulation. Surface projections 41 are disposed only in a part of the reflection plate 4. This is because the difference between the surface projections and the flat portion is visualized. In a concrete way, projections having an inclination angle of 30° and a height of 2 μm are arranged with a pitch of 10 μm in three lines with respect to the center of the reflection plate. A light source 19 is disposed at a position apart from the lens surface by 1 mm such that the horizontal size of the light source covers all the lenses. The light from the light source 19 is diffused light. FIG. 11 is a graph showing the result of simulation. It is recognized that a decrease in the illuminance takes place at an observing position of −30 mm. That is, the display is observed in a reduced brightness, when observing at this position.

In this case, the simulation was carried out, as for only one pixel. However, it is generally that the surface projections are randomly distributed over all the display pixels. Hence, the brightness is detected in a varied state for respective pixels in the display device, and therefore a three-dimensional image, on which an image having a spatially varied brightness is superimposed, is observed, thereby causing quality of the three-dimensional image display to be deteriorated. Such a problem generally occurs not only in the three-dimensional image display device but also in the aforementioned display of simultaneously displaying plural images with respect to plural viewpoints.

SUMMARY OF THE INVENTION

In view of the above-described problems in the prior art, it is an object of the present invention to provide a three-dimensional image display device, which has an excellent display quality without any brightness reduction in the reflection display mode.

It is another object of the present invention to provide a portable terminal device, using such a three-dimensional image display device, which terminal device ensures high quality of display without any brightness reduction in the reflection display mode.

An image display device according to the first aspect of the present invention comprises a display panel which has a plurality of pixel sections provided in the form of a matrix. Each pixel section includes at least a pixel for displaying an image for a first viewpoint and a pixel for displaying an image for a second viewpoint. A lens is disposed in front of the display panel, and is constituted by a plurality of lens elements for refracting light emitted from each pixel to output the light in different directions. A reflection plate is disposed in the display panel or in the rear of the display panel and has surface projections on the surface thereof for reflecting exterior light to the lens. A focal distance f of the lens is different from a distance H between the surface of the reflection plate and the apex of the lens.

In accordance with the first aspect of the invention, the light condensed by the lens illuminates the surface of the reflection plate on a certain area, so that the light is reflected by the surfaces having a different inclination angle, such as inclined surfaces, flat portions of the surface projections to proceed in various directions. In this case, part of the reflected light travels to an observer, and therefore contributes to the display, thereby enabling the brightness reduction due to the shape of the surface projection to be suppressed.

According to the second aspect of the present invention, an image display device comprises a display panel which has a plurality of pixel sections provided in the form of a matrix. Each pixel section includes at least a pixel having a transmissive region and a reflective region for displaying an image for a first viewpoint and a pixel having a transmissive region and a reflective region for displaying an image for a second viewpoint. A lens is disposed in front of the display panel and is constituted by a plurality of lens elements for refracting light emitted from each pixel to output the light in different directions. A light source illuminates the transmissive region of the display panel with the light. A reflection plate is disposed in the reflective region of the display panel or in the rear of the reflective region of the display panel. The reflection plate has surface projections on the surface thereof for reflecting exterior light to the lens. The focal distance f of the lens is different from the distance H between the surface of the reflection plate and the apex of the lens.

In accordance with the second aspect of the invention, the light condensed by the lens also illuminates a certain area in the reflective region, so that the light is reflected by the surfaces having a different inclination angle, such as inclined surfaces, flat portions of the surface projections to proceed in various directions. In this case, part of the reflected light travels to an observer, and therefore contributes to the display, thereby enabling the brightness reduction due to the shape of the surface projection to be suppressed.

In the three-dimensional image display device according to the invention, it is preferable that the focal distance of the lens is smaller than the distance between the reflection plate and the lens.

Moreover, in accordance with the three-dimensional image display device of the invention, when the pitch of the lens is L and the minimum pitch of the surface projections is V, it is preferable that the focal distance f of the lens and the distance H between the surface of the reflection plate and the apex of the lens fulfills the following expression 18:

$$H/f \geq V/L+1 \quad \text{(Expression 18)}$$

Moreover, in accordance with the three-dimensional image display device of the invention, when the optimal observation distance of the three-dimensional image display device is OD, the expanded projection width of a pixel is e, the refraction index of the lens is n and the pitch of the pixels in the pixel section is P, it is preferable that the focal distance f of the lens fulfills the following expressions 19 to 21:

$$\beta = \arctan(e/OD) \quad \text{(Expression 19)}$$

$$\alpha = \arcsin(1/n \cdot \sin \beta) \quad \text{(Expression 20)}$$

$$f = P/\tan \alpha \quad \text{(Expression 21)}$$

From this structural arrangement according to the invention, the brightness reduction due to the shape of the surface projections can be suppressed.

In the three-dimensional image display device according to the invention, it is preferable that the optimal observation distance OD, the expanded projection width e of a pixel, the refraction index n of the lens, the distance H between the surface of the reflection plate and the center of the convex portion in the surface of the lens, and the pitch P of pixels in each of the display sections fulfill the above expressions 19 and 20, and the following expression 22:

$$H = P/\tan \alpha \quad \text{(Expression 22)}$$

Furthermore, the present invention is applicable even in the case when the distance between the lens surface and the pixel is fixed, and the brightness reduction due to the shape of the surface projections can be suppressed.

Moreover, the three-dimensional image display device according to the invention can be designed such that the focal distance of the lens is larger than the distance H between the surface of the reflection plate and the apex of the lens.

Moreover, in the three-dimensional image display device according to the invention, it is preferable that the focal distance f of the lens, the distance H between the surface of the reflection plate and the apex of the lens, the lens pitch L and the minimum pitch V of the surface projections fulfill the following expression 23:

$$H/f \leq -V/L+1 \quad \text{(Expression 23)}$$

Moreover, in the three-dimensional image display device according to the invention, it is preferable that the optimal observation distance OD, the expanded projection width e of a pixel, the refraction index n of the lens, the focal distance f of the lens and the pitch P of the pixels in each of the pixel sections fulfill the above expressions 19 to 21. In the structural arrangement according to the invention, the distance between the lens surface and the pixel can be decreased, thereby enabling the total thickness of the three-dimensional image display device to be decreased.

Moreover, in the three-dimensional image display device according to the invention, it is preferable that the optimal observation distance OD, the expanded projection width e of a pixel, the refraction index n of the lens, the distance H between the surface of the reflection plate and the apex of the lens, and the pitch P of the pixels in each of the pixel sections fulfill the above expressions 19, 20 and 22. In the structural arrangement according to the invention, the focal distance can be determined in a greater value, and therefore the magnitude of the amplitude of the unevenness in the lens can be decreased. Accordingly, no noticeable modulation in the lens surface can be discerned, thereby enabling the display quality of the three-dimensional image to be enhanced.

In accordance with the third aspect of the invention, an image display device comprises a display panel which has a plurality of pixel sections provided in the form of a matrix. Each pixel section includes at least a pixel for displaying an image for a first viewpoint and a pixel for displaying an image for a second viewpoint A lens is disposed in front of the display panel and is constituted by a plurality of lens elements for refracting light emitted from each pixel to output the light in different directions. A reflection plate is disposed in the display panel or in the rear of the display panel. The reflection plate has surface projections on the surface thereof for reflecting the exterior light to the lens. The focal distance f of the lens is the same as the distance H between the surface of the reflection plate and the apex of the lens, and the surface projections on the surface of the reflection plate is designed in such a way that the light entering the three-dimensional image display device is reflected plural times.

In accordance with the fourth aspect of the invention, an image display device comprises a display panel which has a plurality of pixel sections provided in the form of a matrix. Each pixel section includes at least a pixel having a transmissive region and a reflective region for displaying an image for a first viewpoint and a pixel having a transmissive region and a reflective region for displaying an image for a second viewpoint. A lens is disposed in front of the display panel and is constituted by a plurality of lens elements for refracting light emitted from each pixel to output the light in different directions. A light source illuminates the transmissive region of the display panel with the light. And a reflection plate is disposed in the reflective region of the display panel or in the rear of the reflective region of the display panel. The reflection plate has surface projections on the surface thereof for reflecting the exterior light to the lens. The focal distance f of the lens is the same as the distance H between the surface of the reflection plate and the apex of the lens. The surface projections on the surface of the reflection plate is designed in such a way that the light entering the three-dimensional image display device is reflected plural times.

In the present invention, part of the light reflected by an inclined surface of a surface projection is reflected again by another inclined surface to travel toward an observer, so that the brightness reduction due to the shape of the surface projection can be suppressed.

Moreover, in the three-dimensional image display device according to the invention, it is preferable that the inclination angle of the surface projections is 50° or more. Accordingly, the brightness reduction due to the shape of the surface projection can be suppressed.

According to the fifth aspect of the invention, an image display device comprises a display panel which has a plurality of pixel sections provided in the form of a matrix. Each pixel section includes at least a pixel for displaying an image for a first viewpoint and a pixel for displaying an image for a second viewpoint. A lenticular lens is disposed in front of the display panel and is constituted by a plurality of cylindrical lenses for refracting light emitted from each pixel to output the light in different directions. A reflection plate is disposed in the display panel or in the rear of the display panel. The reflection plate has surface projections on the surface thereof for reflecting exterior light to the lens. A probability of existence of an inclined surface having an inclination angle on the surface projections is uniform in each of the pixels in an array direction of the cylindrical lenses.

According to the sixth aspect of the invention, an image display device comprises a display panel which has a plurality of pixel sections provided in the form of a matrix. Each pixel section includes at least a pixel having a transmissive region and a reflective region for displaying an image for a first viewpoint and a pixel having a transmissive region and a reflective region for displaying an image for a second viewpoint. A lenticular lens is disposed in front of the display panel and is constituted by a plurality of cylindrical lenses for refracting light emitted from each pixel to output the light in different directions. A light source illuminates the transmissive region of the display panel with the light. And a reflection plate is disposed in the reflective region of the display panel or in the rear of the reflective region of the display panel and has surface projections on the surface thereof for reflecting exterior light to the lens. A probability of existence of an inclined surface having an inclination angle on the surface projections is uniform in each of the pixels in an array direction of said cylindrical lenses.

As the cylindrical lenses do not have a lens effect in the longitudinal direction, the optical effect of the surface projections in each pixel is the result of integrating the effects of the cylindrical lenses in the longitudinal direction. If the probability of existence of an inclined surface having an inclination angle on the surface projections is uniform in each pixel, the optical characteristic becomes equivalent to that in the case where the same inclination angle is continuously set at all the positions in the array direction of the cylindrical lenses. This can prevent a reduction in brightness which would originate from the surface projections.

In the image display devices according to the fifth and sixth aspects of the invention, it is preferable that the pitch of the surface projections in a longitudinal direction of the cylindrical lenses should be smaller than the pitch of the surface projections in the array direction of the cylindrical lenses. Accordingly, the surface projections can be laid out in a single pixel at a high density, thus facilitating adaptation of this image display device to a high-definition display panel having smaller pixel pitches.

In the three-dimensional image display device according to the invention, the lens is preferably either a lenticular lens or a fly-eye lens. Furthermore, the display device is preferably a liquid crystal display device.

A portable terminal device according to the invention is equipped with the above-mentioned three-dimensional image display device. In this case, the portable terminal device may be a cellular phone, portable terminal, PDA (Personal Digital Assistance: portable information terminal), game machine, digital camera or digital video camera.

As described above in detail, in accordance with the present invention, the light condensed by a lens is incident on the reflection plate with a certain illumination area, so that the light is reflected by inclined surfaces having different inclination angle and the flat surfaces of the surface projections and therefore the reflected light proceeds in various directions. In this case, part of the reflected light travels toward the observer, and therefore provides a positive contribution to the display. As a result, the structural arrangement according to the invention is capable of preventing the brightness reduction due to the surface projections, thereby making it possible to obtain a three-dimensional image display device providing an excellent image quality without brightness reduction in the reflection display mode.

THE PREFERRED EMBODIMENTS OF THE INVENTION

Referring now to the accompanying drawings, the preferred embodiments of the invention will be described in a concrete manner.

First Embodiment

Figure 12:
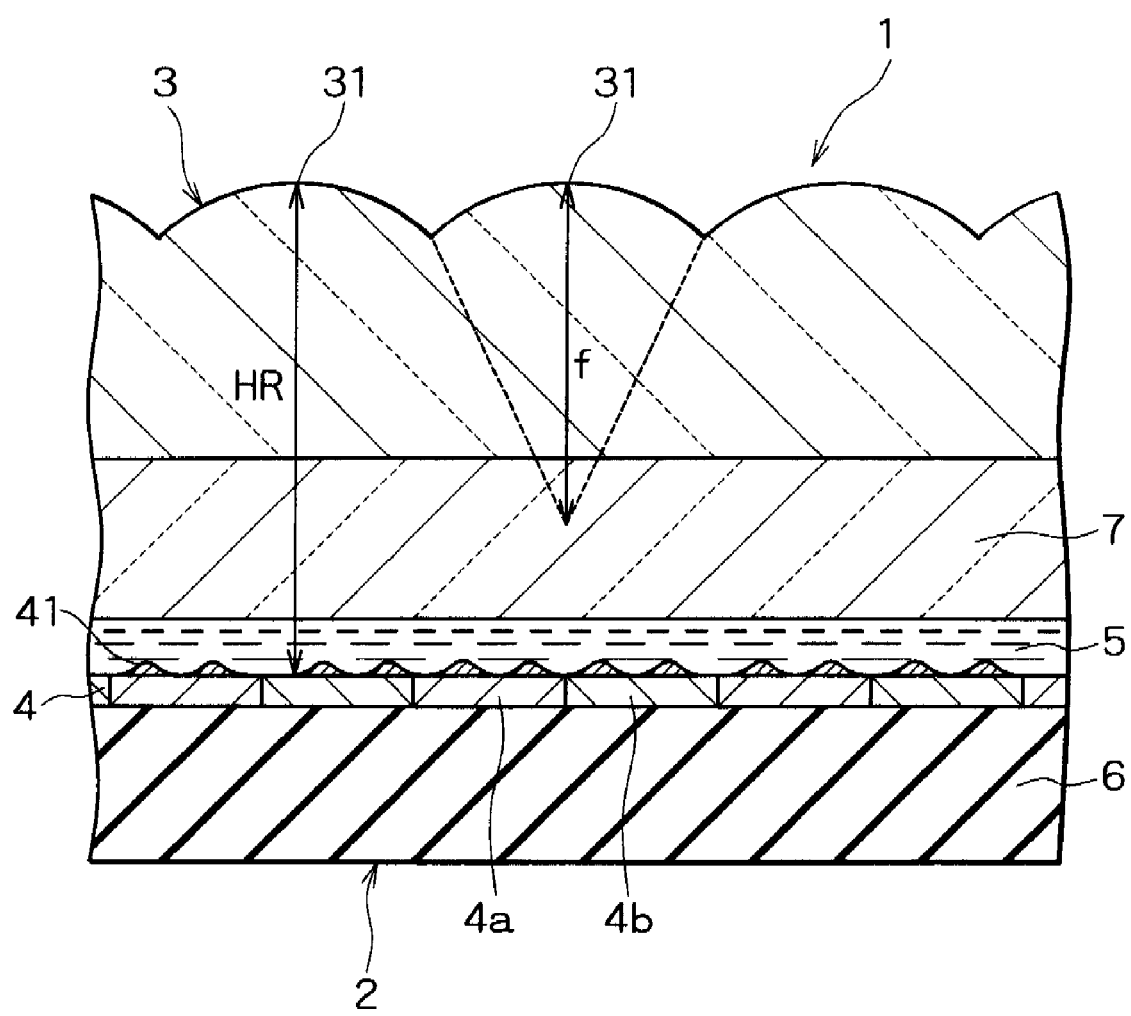
FIG. 12 is a sectional view of a three-dimensional image display device in a first embodiment of the invention.
Figure 13:
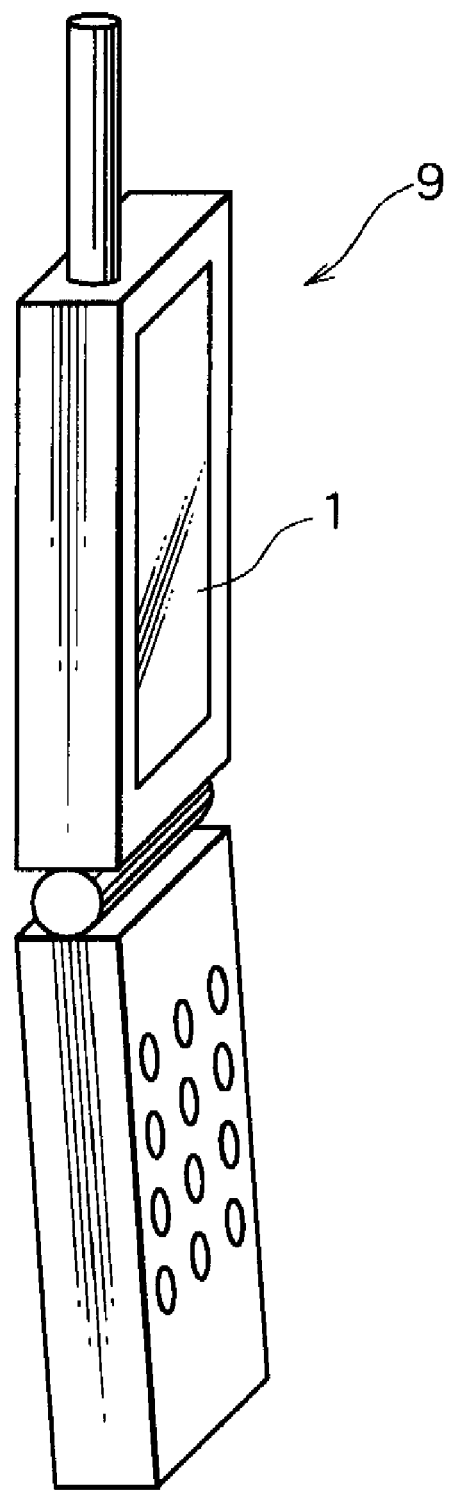
FIG. 13 is a perspective view of a portable terminal device in the first embodiment of the invention.

FIG. 12 is a sectional view of a three-dimensional image display device in a first embodiment of the invention, and FIG. 13 is a perspective view of a portable terminal device in the first embodiment of the invention. The three-dimensional image display device 1 comprises a reflective liquid crystal display panel 2 and a lenticular lens 3. In the reflective liquid crystal display panel 2, a liquid crystal layer 5 is interposed between a base plate 6 and a transparent substrate 7, and a pixel electrode (reflection plate 4) is formed on the liquid crystal layer side surface of the substrate 6, and a counter electrode (not shown) is formed on the liquid crystal layer side surface of the transparent substrate 7. The pixel electrode and counter electrode are stripe-shaped electrodes which are disposed perpendicular to each other. A voltage is applied between the pixel electrode and counter electrode to select a pixel determined at a cross point of these electrodes, and therefore the orientation of the liquid crystal can be controlled to display an image.

In the first embodiment, the reflection plate 4 is constituted by the pixel electrodes disposed on the rear side of the liquid crystal layer 5. The reflection plate has surface projections 41, and the size of the surface projection 41 is similar to that of the surface projection on the reflection plate of a conventional reflective liquid crystal display device. For example, the surface projection has a height of 2 μm and a pitch of 10 μm.

The lenticular lens 3 is disposed on the transparent substrate 7. The lenticular lens 3 is formed by a number of curved surfaces (cylindrical surfaces) where convex portions 31 are repeatedly arranged in a predetermined pitch. In the first embodiment, the longitudinal direction of the cylindrical surfaces (the direction in which the central axial line of the curved surface extends) is parallel to the direction in which the pixel electrode (reflection plate 4) extends. In this case, two paired pixels (pixel electrode 4) are disposed for each cylindrical surface.

In the first embodiment, as described above, a pixel section is constituted by both a pixel 4a for the left eye and a pixel 4b for the right eye. In each pixel section, the light emitted from the pixel for the left eye and the light emitted from the pixel for the right eye are deflected in the directions toward the left eye and the right eye respectively by a corresponding cylindrical lens in the lenticular lens 3. Under this condition, the exterior light passes through the lenticular lens 3, transparent substrate 7 and liquid crystal layer 5, and then arrives at the reflection plate 4 positioned in the under surface of the liquid crystal layer 5. Subsequently, the exterior light is reflected by the reflection plate 4 and again passes through the liquid crystal layer 5, transparent substrate 7 and lenticular lens 3. In this case, the exterior light incident on the reflection plate 4 in a certain direction is reflected in the state of diffused light and in varied directions by the surface projections 41 on the surface of the reflection plate 4 and further reflected in the direction toward an observer. Accordingly, the light source can be prevented from being imaged on the display surface, thereby making it possible to effectively use the exterior light proceeding in various directions.

In the first embodiment, therefore, the distance HR between the center of the convex portion 31 on the surface of the lenticular lens 3 and the surface of the reflection plate 4, i.e., the pixel is set greater than the distance H between the center of the convex portion on the surface of the lenticular lens 3 and the pixel in the conventional optical model where the distance H is determined by the above-mentioned expressions 10 to 12. As a result, the distance HR between the lens surface and the pixel is greater than the focal distance f of the lenticular lens 3. In the first embodiment, the focal distance f of the lenticular lens 3 is determined by the expressions 10 to 12 and 16. In this case, the observation distance OD is, for instance, an optimal observation distance defined below. The optimal observation distance is a distance between the reflective liquid crystal display panel 2 and the longest line segment among line segments extending in the direction from the pixel 4a for the left eye to the pixel 4b for the right eye of a pixel section in a three-dimensional visible range in which the light emitted from the pixel for imaging an image for the left eye enters the left eye, and the light emitted from the pixel for imaging an image for the right eye enters the right eye, when specifying the midpoint of the right eye and the left eye of an observer.

The three-dimensional image display device 1 in the first embodiment is used, for instance, for displaying an image in the cellular phone 9 shown in FIG. 13.

Figure 14:
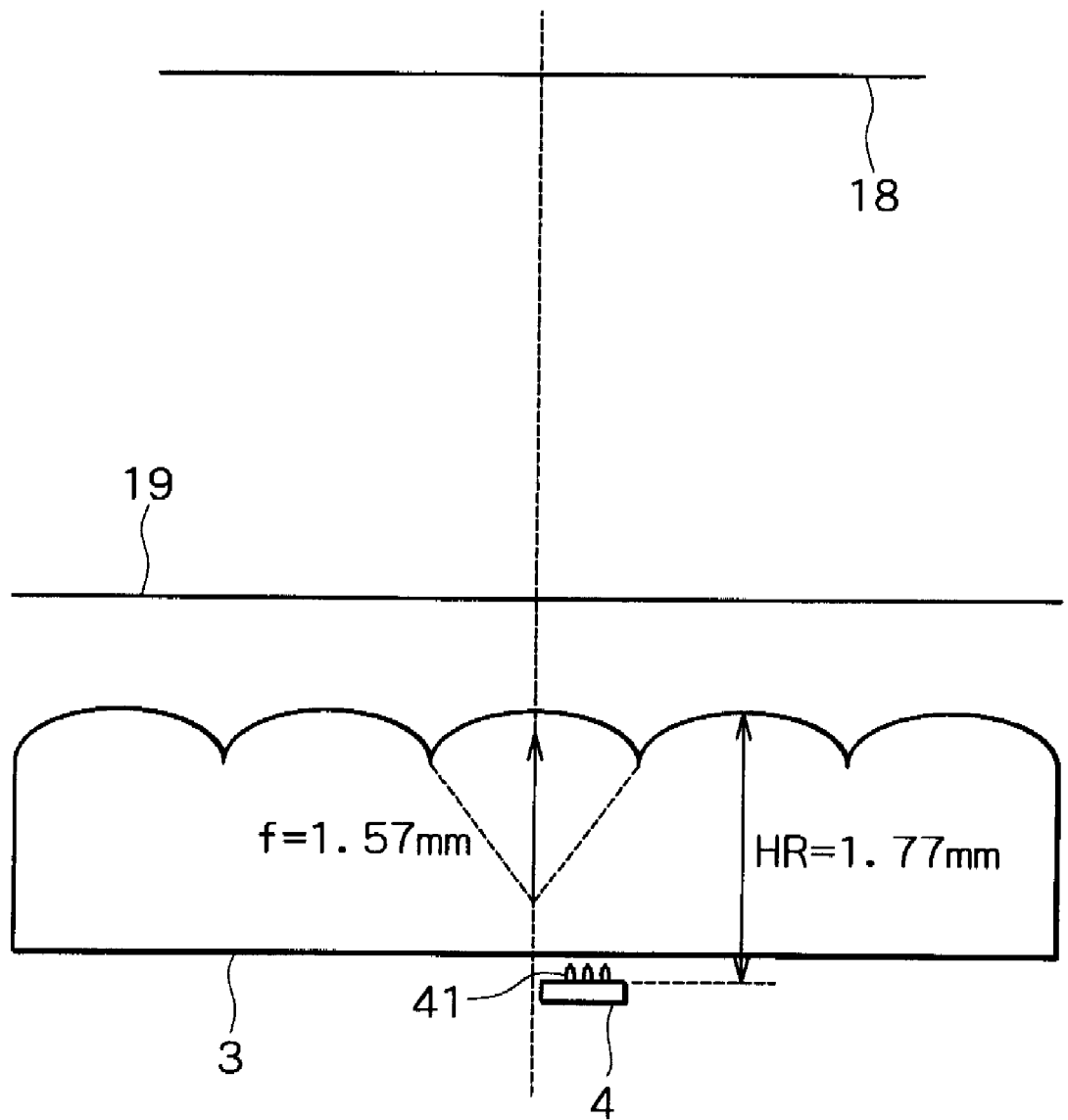
FIG. 14 is a ray diagram showing an optical model used for the computer simulation in the first embodiment of the invention.

In the following, the result of a computer simulation carried out for elucidating the advantages of the present invention is described. FIG. 14 shows an optical model used in the computer simulation. In the conventional optical model shown in FIG. 10, the distance HR between the lens surface (the center of the convex portion) and the pixel is set to be 1.57 mm, and it is identical with the focal distance of the lens, f=1.57 mm. On the contrary, the optical model of the invention shown in FIG. 14 is different from that in FIG. 10 as for the following point: The distance HR between the lens surface (the center of the convex portion) and the pixel is set to be 1.77 mm, and it is greater than the focal distance of the lens, f=1.57 mm.

Figure 10:
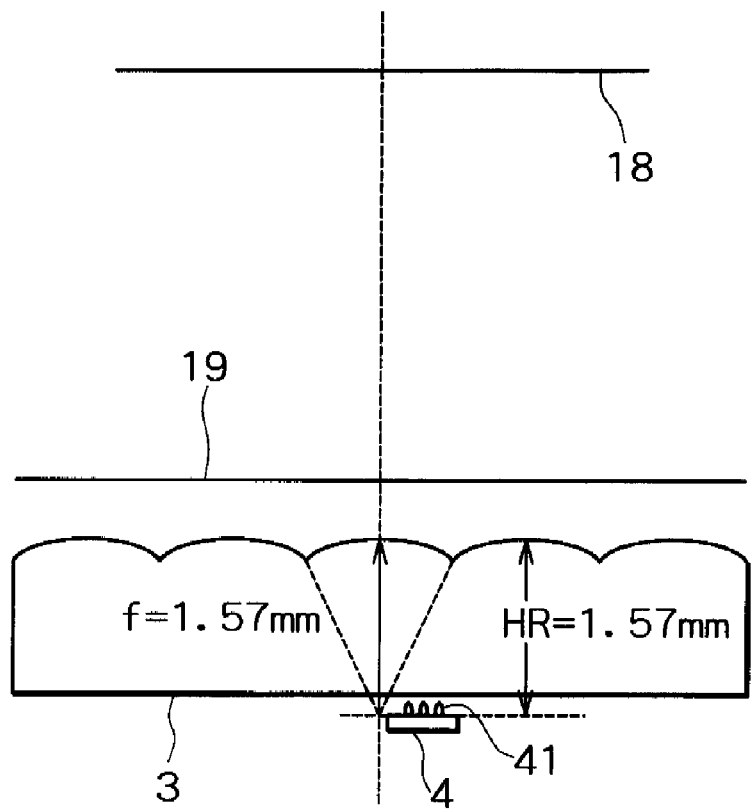
FIG. 10 is a ray diagram showing a optical model for the computer simulation in the three-dimensional image display device using both a conventional lenticular lens and a display panel in the case when a reflection plate having surface projections is used.
Figure 11:
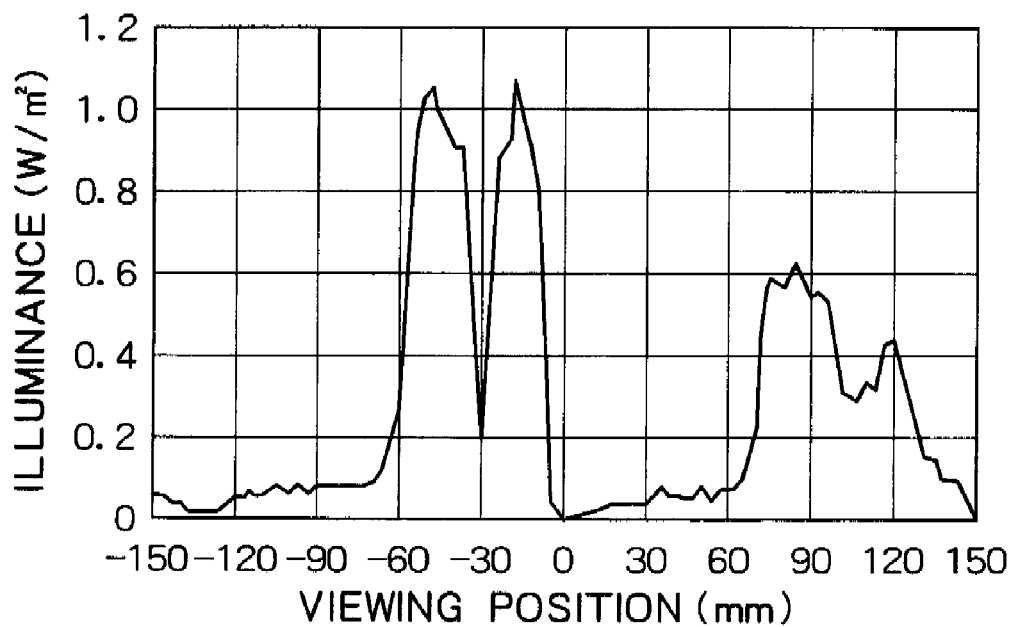
FIG. 11 is a graph showing the result of the computer simulation in the three-dimensional image display device using both the conventional lenticular lens and the display panel in the case when a reflection plate having surface projections is used.
Figure 15A:
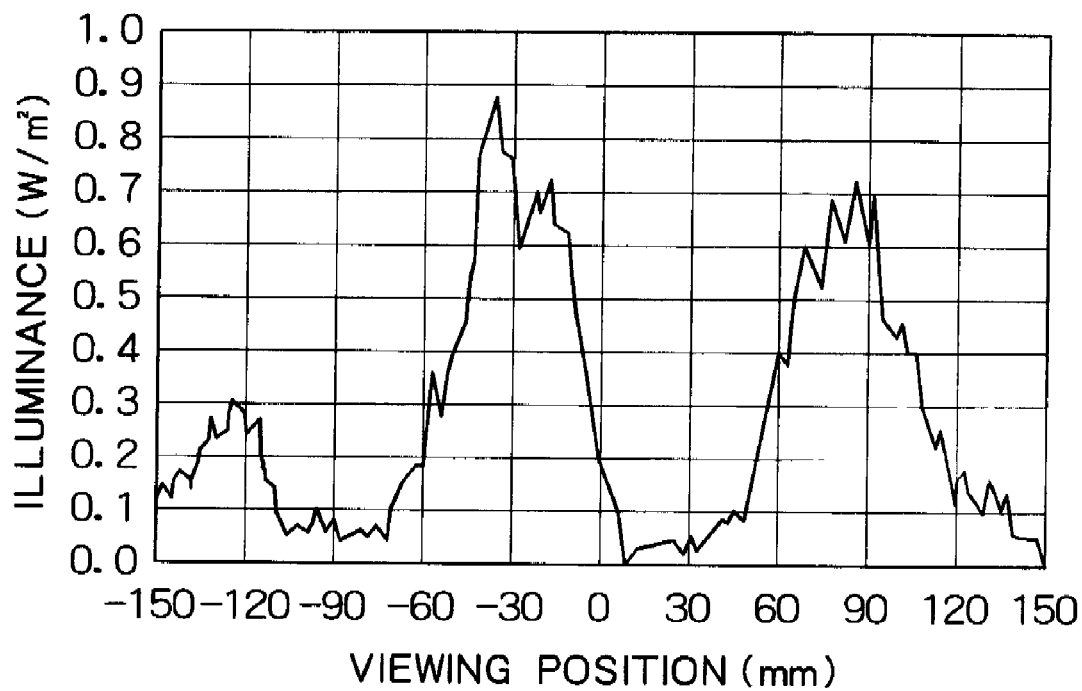
FIGS. 15A and 15B are graphs each showing the result of the computer simulation in the first embodiment of the invention.
Figure 15B:
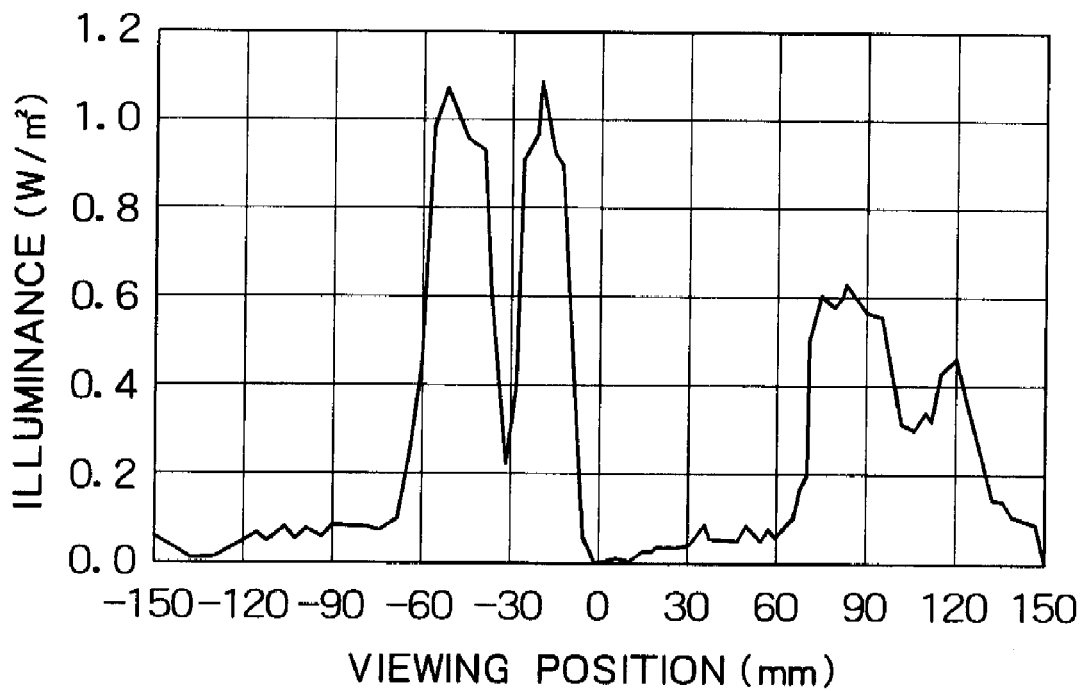

FIG. 15A is a graph showing the result of a simulation in the case when the optical model of the present invention shown in FIG. 14 is used, whereas FIG. 15B is a graph showing the result of a simulation in the case when the optical model in the prior art shown in FIG. 10 is used as a comparative example. A comparison between these graphs reveals that the reduction in the brightness shown in FIG. 15B at the observing position in the vicinity of −30 mm is greatly decreased as shown in FIG. 15A. Accordingly, a dark display is no longer observed at the observing position of approximately −30 mm.

Figure 16A:
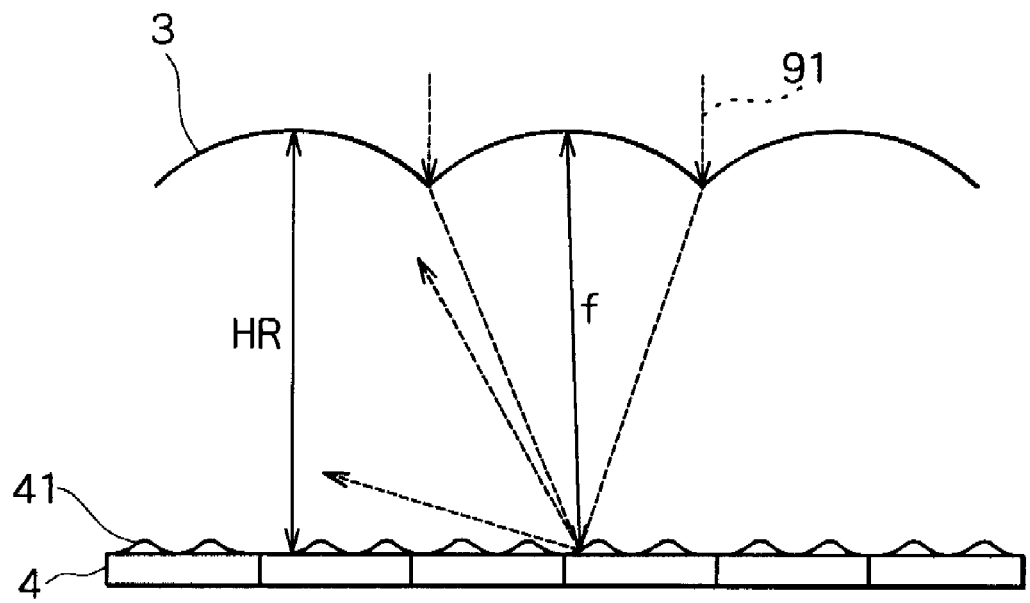
FIGS. 16A and 16B are conceptual ray diagrams for explaining the principle in the first embodiment of the invention.
Figure 16B:
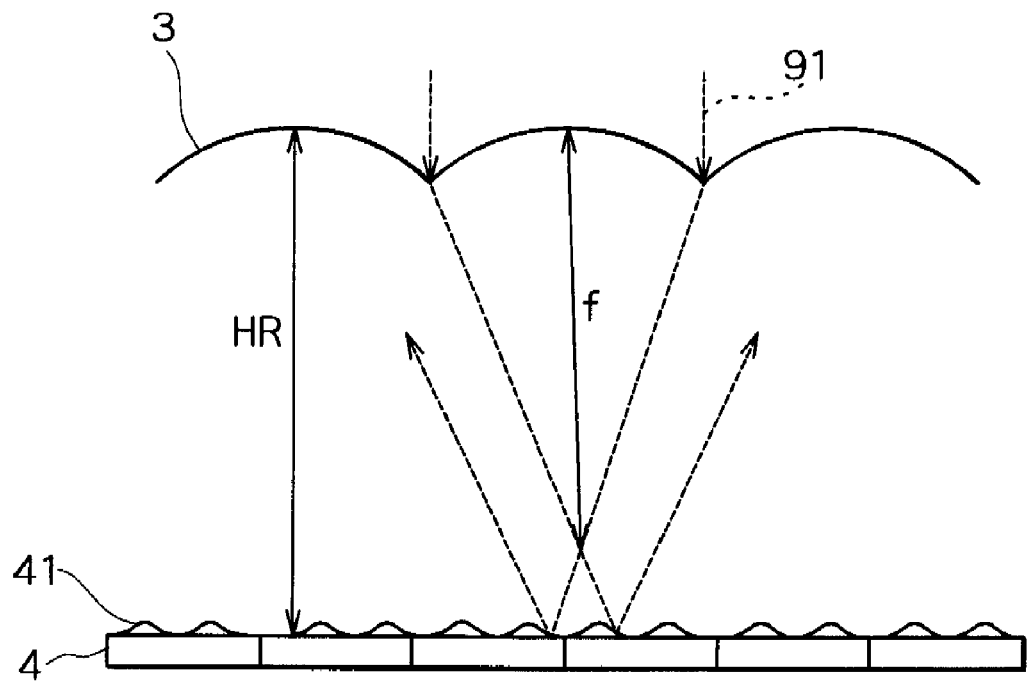

FIGS. 16A and 16B are conceptual ray diagrams for qualitatively explaining the principle of the invention. FIG. 16A is the conceptual diagram showing the trajectories of light rays 91 having a parallel component of the exterior light entering the display device in the optical model shown in FIG. 10. In this case, the distance H between the lens surface and the pixel is set such that it is identical with the focal distance f, so that the light 91 condensed by the lenticular lens 3 forms a focal point on the surface of the reflection plate 4, is reflected by the inclined surface of the surface projection and proceeds in the direction different from that toward the observer, thereby causing such light ray components to provide no substantial contribution to the display. On the contrary, the distance HR between the lens surface and the pixel is set greater than the focal distance f in the optical model of the invention shown in FIG. 16B, so that the light condensed by the lenticular lens 3 illuminates a certain area on the reflection plate 4. Since, therefore, the light is reflected by various inclined surfaces, such as inclined surfaces, flat portion or the like of the surface projections, the light thus reflected proceeds in various directions. Part of the reflected light proceeds toward the observer, thereby making it possible to contribute the reflected light to the display. In accordance with the present invention, therefore, a reduction in the brightness can be prevented.

Figure 17:
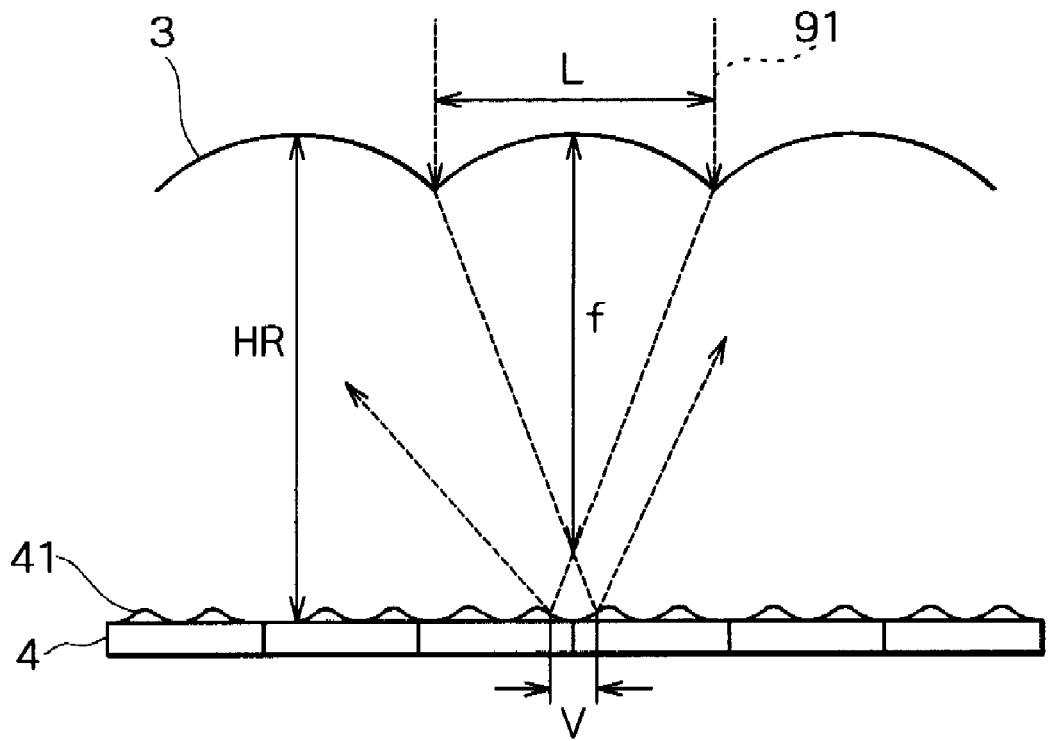
FIG. 17 is a ray diagram in the first embodiment of the invention where the light condensed by a lens illuminates a plurality of inclined surfaces.

As shown in FIG. 17, regarding the distance HR between the lens surface and pixel, it is particularly preferable that the structural arrangement is designed such that the light condensed by the lenticular lens 3 illuminates a number of surfaces having an inclination angle different from each other, because such a structural arrangement provides a wider angular distribution of the reflected light, and therefore the intensity of light toward the observer can be increased. Under this condition, a similar relationship holds between a triangle having a length of the base being the lens pitch L and a height being the focal distance f and a triangle having the length of the base being the pitch V of the surface projections and a height being an amount of the distance HR between the lens surface and pixel subtracted by the focal distance f, when the pitch of the surface projections is V. Accordingly, the conditions that the light condensed by the lens illuminates the surfaces having an inclination angle different from each other can be expressed by the following expression 24, and a transformation of this expression provides the following expression 25.

$$V \leq (HR-f) \times L/f \quad \text{(Expression 24)}$$

$$HR/f \geq V/L + 1 \quad \text{(Expression 25)}$$

In other words, it is preferable to determine the distance HR between the lens surface and the pixel so as to fulfill the expression 25. Moreover, in the case when the surface projections are distributed in a random manner, the present invention can be realized by determining V from the minimum pitch of the surface projections.

The display panel according to the invention can be realized, when there exists a reflection plate having surface projections on the pixel electrode. In the first embodiment, the three-dimensional image display device using the reflective liquid crystal display panel is exclusively described. However, the present invention is not restricted to such an image display device. A display panel, based on, for instance, the electrophoresis phenomena can also be employed. Furthermore, any structure having inclined surfaces can be used as a surface projection independent of the shape, e.g., spot-like shape, rod-like shape, groove-like shape and others. Moreover, either an active matrix method, such as TFT method, TFD method or the like, or a passive matrix method, such as STN method or the like, can be employed to drive the pixel electrodes.

Figure 1:
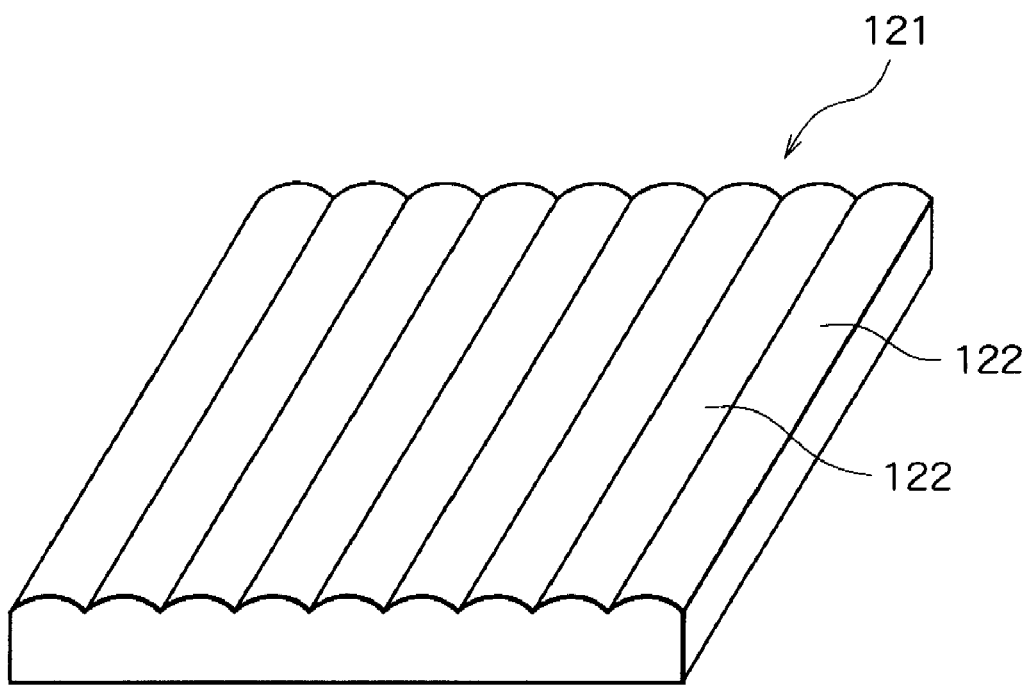
FIG. 1 is a perspective view showing the shape of a lenticular lens.
Figure 2:
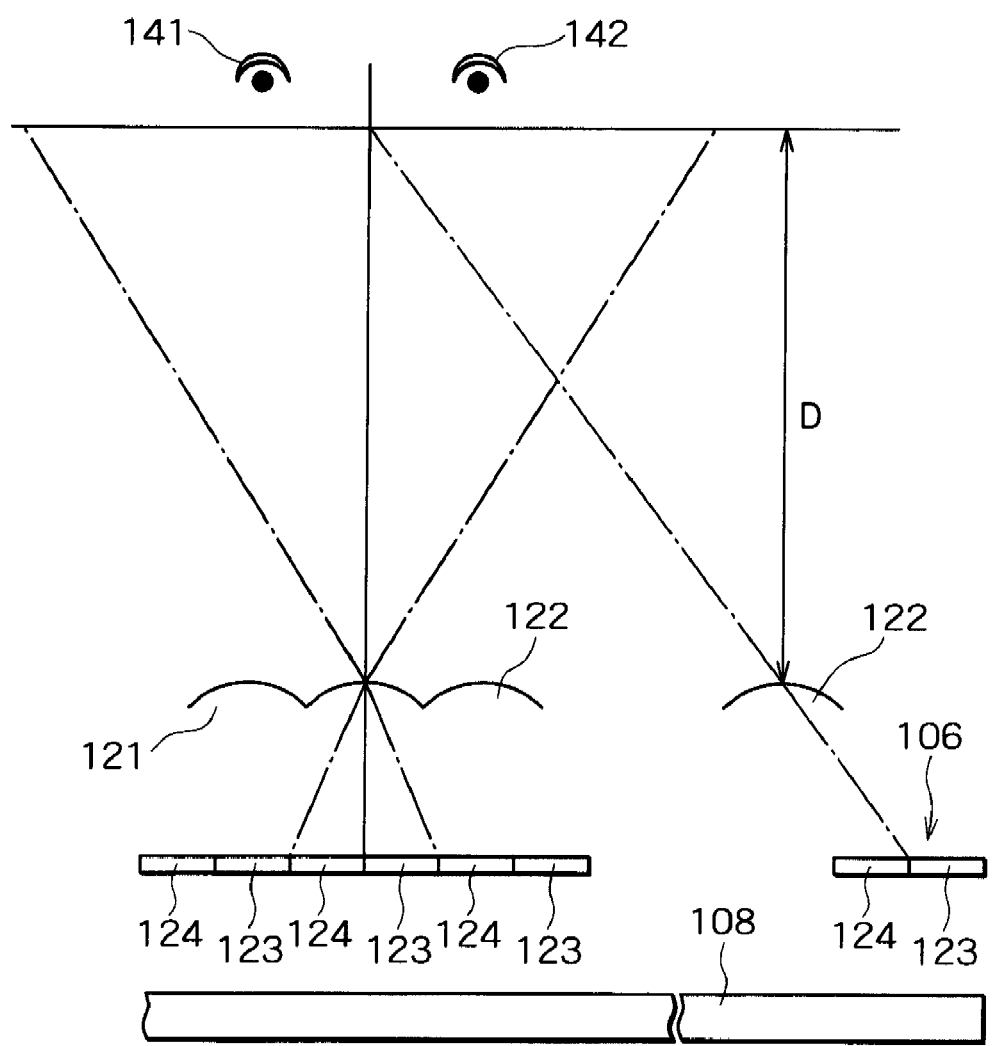
FIG. 2 is a ray diagram showing an optical model in the three-dimensional image display method using a conventional lenticular lens.
Figure 3:
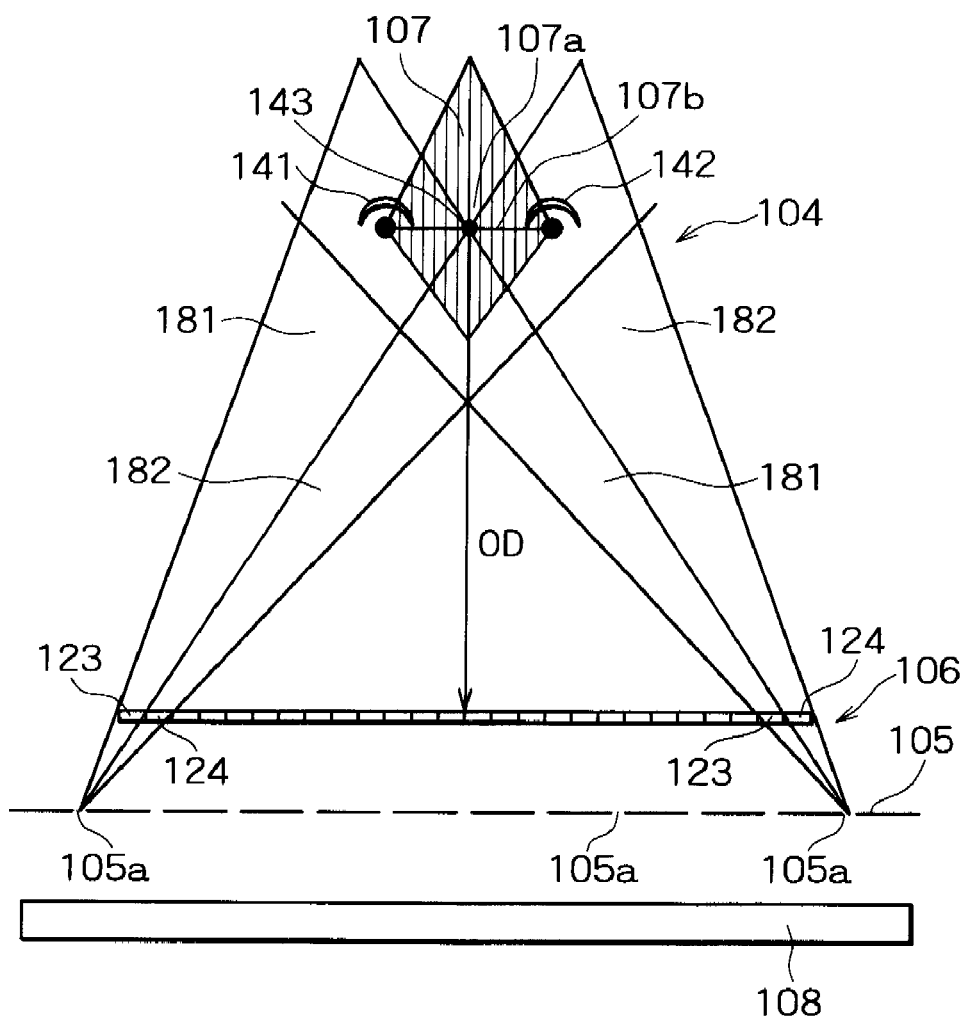
FIG. 3 is a ray diagram showing an optical model in the three-dimensional image display method using a conventional parallax barrier.
Figure 4:
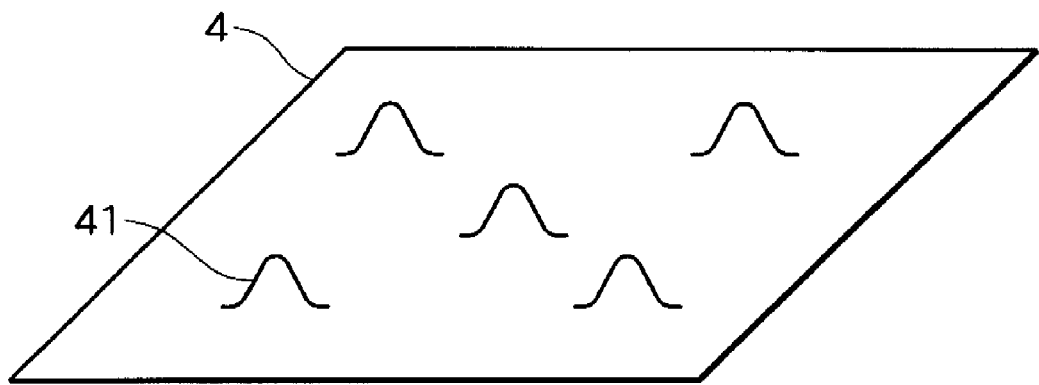
FIG. 4 is a conceptual perspective view of a reflection plate having conventional surface projections.
Figure 5:
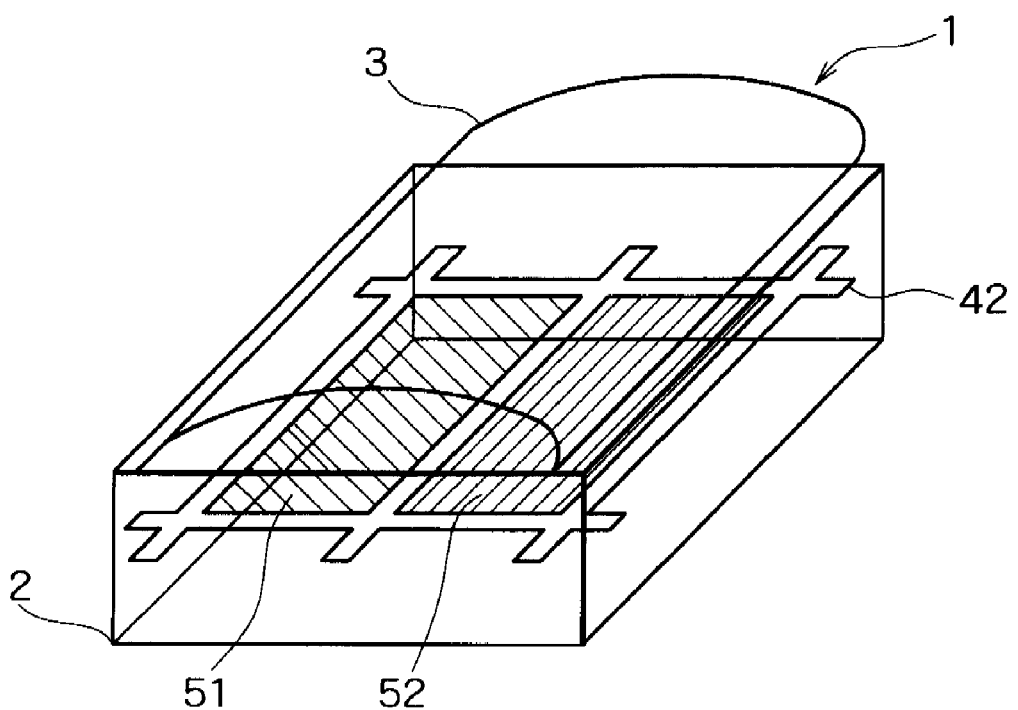
FIG. 5 is a perspective view of a three-dimensional image display device using both a conventional lenticular lens and a display panel.
Figure 6:
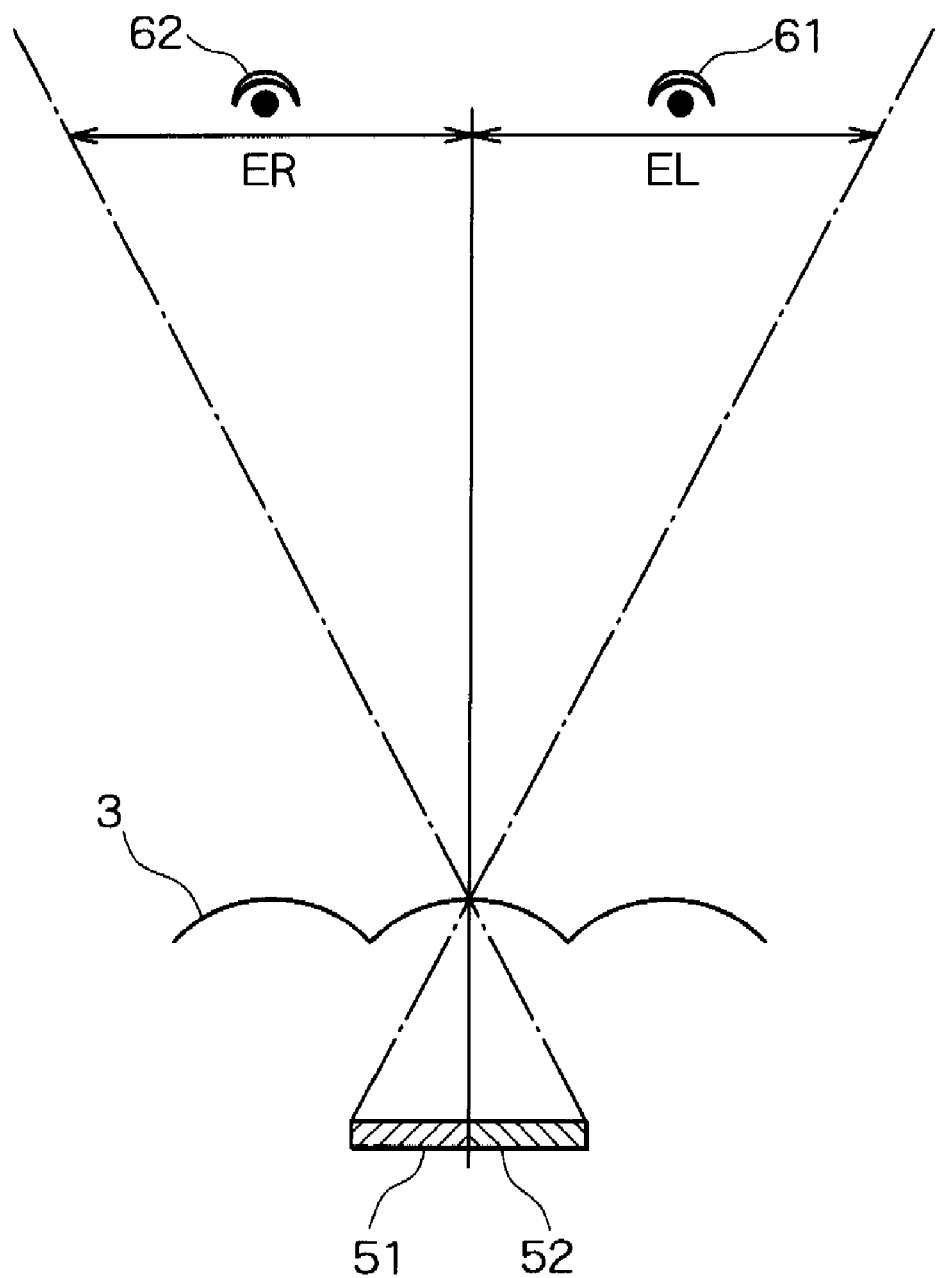
FIG. 6 is a sectional view of the three-dimensional image display device using both the conventional lenticular lens and the display panel.
Figure 7:
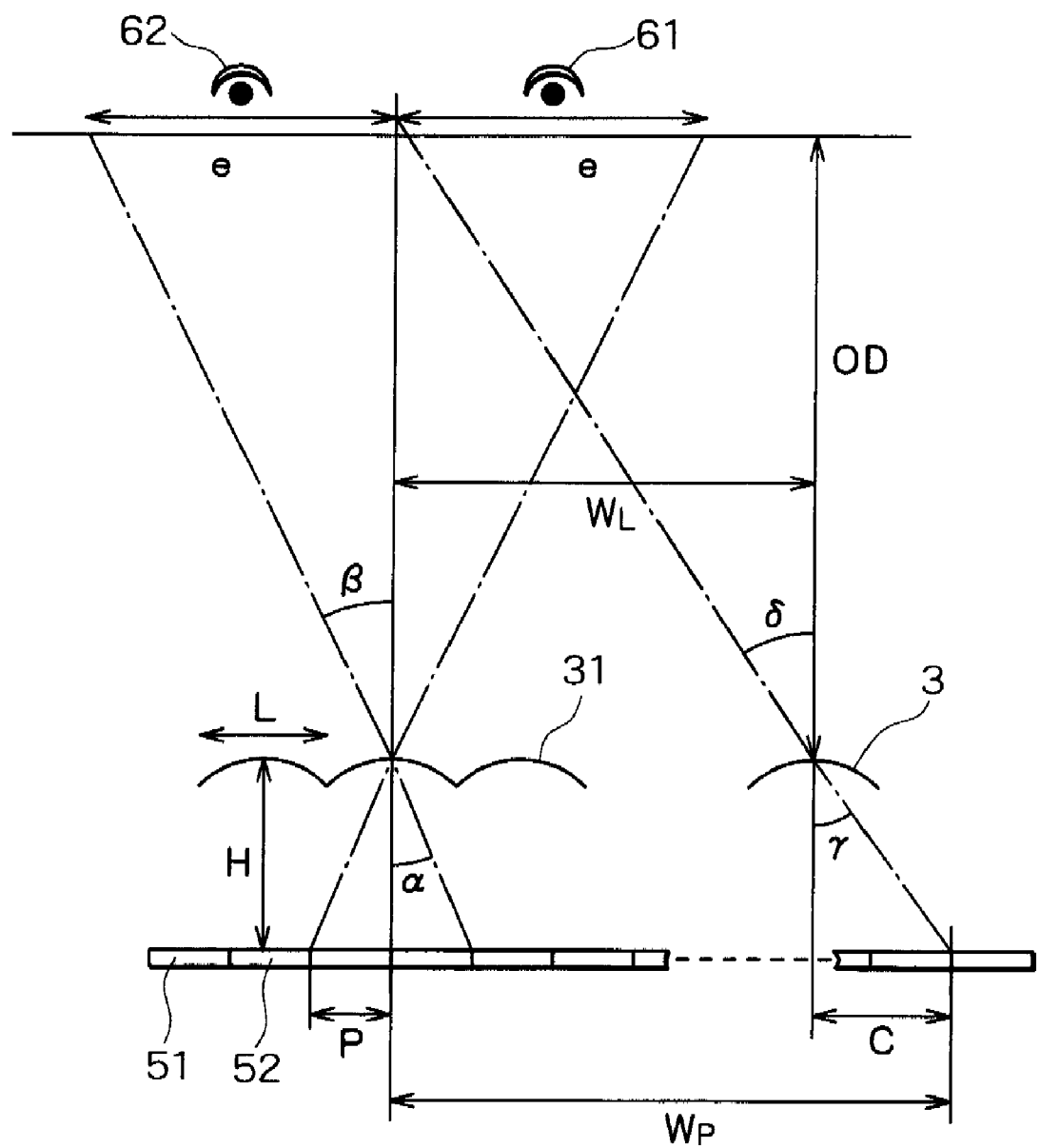
FIG. 7 is a ray diagram in the three-dimensional image display device using both a conventional lenticular lens and a display panel where the dimension of individual elements is defined.
Figure 8:
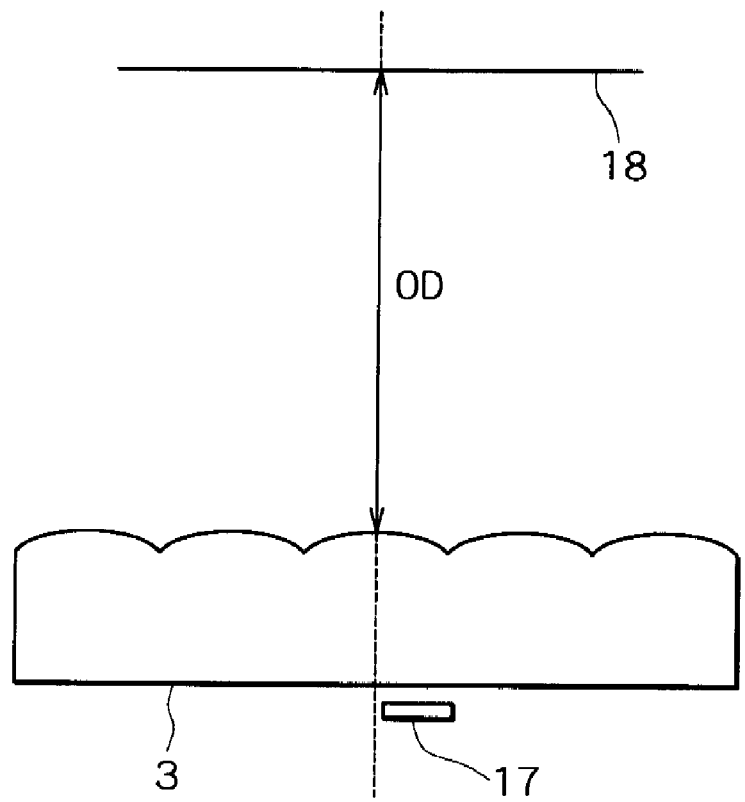
FIG. 8 is a ray diagram showing an optical model for the computer simulation in the three-dimensional image display device using both a conventional lenticular lens and a display panel.
Figure 9:
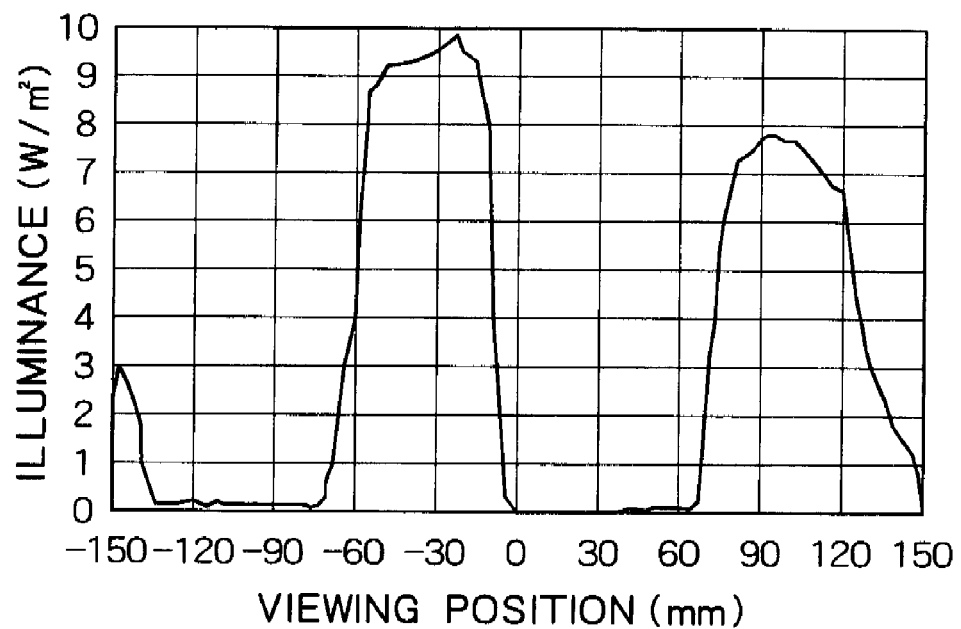
FIG. 9 is a graph showing the result of the computer simulation in the three-dimensional image display device using both the conventional lenticular lens and the display panel.
Figure 18:
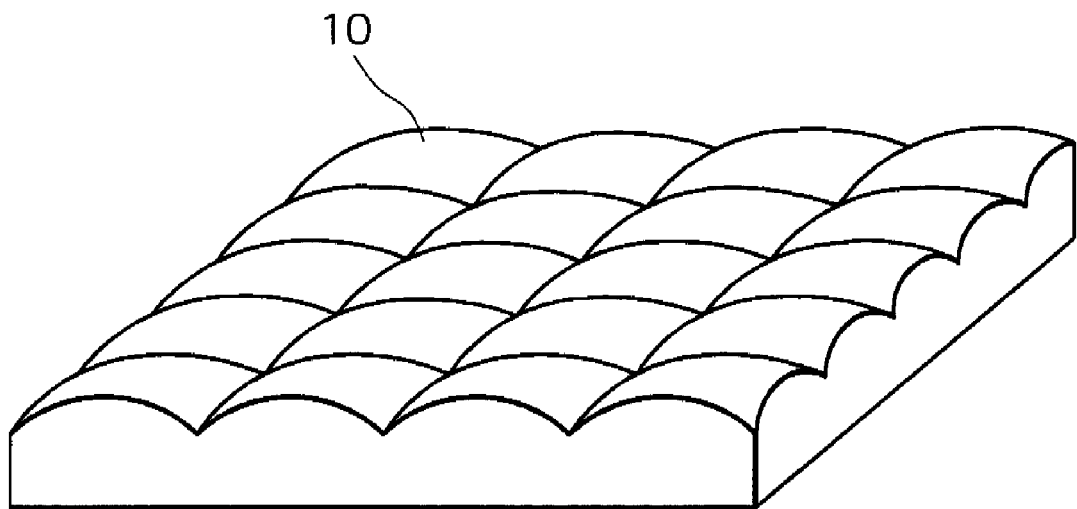
FIG. 18 is a perspective view of a fly-eye lens used instead of the lenticular lens.

The above description is provided for the three-dimensional image display device using the lenticular lens, but a fly-eye lens can also be, of course, used, instead of the lenticular lens. FIG. 18 is a perspective view of a fly-eye lens 10. The lenticular lens 3 has cylindrical lenses 3, all of which extend parallel to each other in a direction, as shown in FIG. 1, wherein the convex surfaces in the cylindrical lenses are arranged repeatedly in the direction from the pixel for the left eye to the pixel for the right eye in a pixel section, i.e., in the horizontal direction, but each convex surface dose not change in the direction perpendicular to the horizontal direction, i.e., in the longitudinal direction of the lenticular lens 3. That is, the sectional shape of the lenticular lens 3 viewed in the horizontal direction does not change in the longitudinal direction of the lenticular lens 3. In contrast to the lenticular lens, the fly-eye lens has convex surfaces, which repeatedly extend both in the horizontal direction from the pixel for the left eye to the pixel for the right eye as well as in the direction perpendicular thereto. In other words, the fly eye lens 10 has a convex surface for each pair of the pixel for the left eye and the pixel for the right eye in the direction (horizontal direction) in which the pixel for the left eye and the pixel for the right eye face each other, as similarly to the lenticular lens, but it also has a convex surface for each pair of tow pixels (two pixels for the left eye or two pixels for the right eye) in the direction perpendicular to the horizontal direction.

In the case of the fly-eye lens, the three-dimensional image display device allows a three-dimensional image to be observed from both an image for the left eye and an image for the right eye, when it is set so as to stand upright. Moreover, the display device makes it possible either to widen the viewing angle or to observe an upper and/or lower side of an image by deflecting the image in the up/down direction. Hence, in the case when the fly-eye lens 10 is used for the lens, an effect similar to that in the first embodiment can be obtained by setting the focal distance f of the lens so as to be different from the distance H between the surface of the reflection plate and the center of the convex portion on the lens surface, as similarly to the first embodiment.

The above description is given as for the case when the convex portion of the lens is located on the side of the observer. However, a similar effect can also be obtained when the convex portion of the lens is disposed on the side of the display device.

The three-dimensional image display device according to the first embodiment can be used preferably in the portable device, such as a cellular phone or the like, and a three-dimensional image having a good quality can be obtained with the image display device. In the case when the three-dimensional image display device is used in such a portable device, an optimal visible range can be soon recognized, different from that in the case when it is introduced into a large-sized display device, because the observer is able to arbitrarily adjust the positional relationship between his own eyes and the display screen.

Moreover, the three-dimensional image display device according to the first embodiment can be introduced not only into a cellular phone, but also into a portable terminal device, such as a portable terminal, PDA, game machine, digital camera, digital video camera or the like.

Second Embodiment

Figure 19:
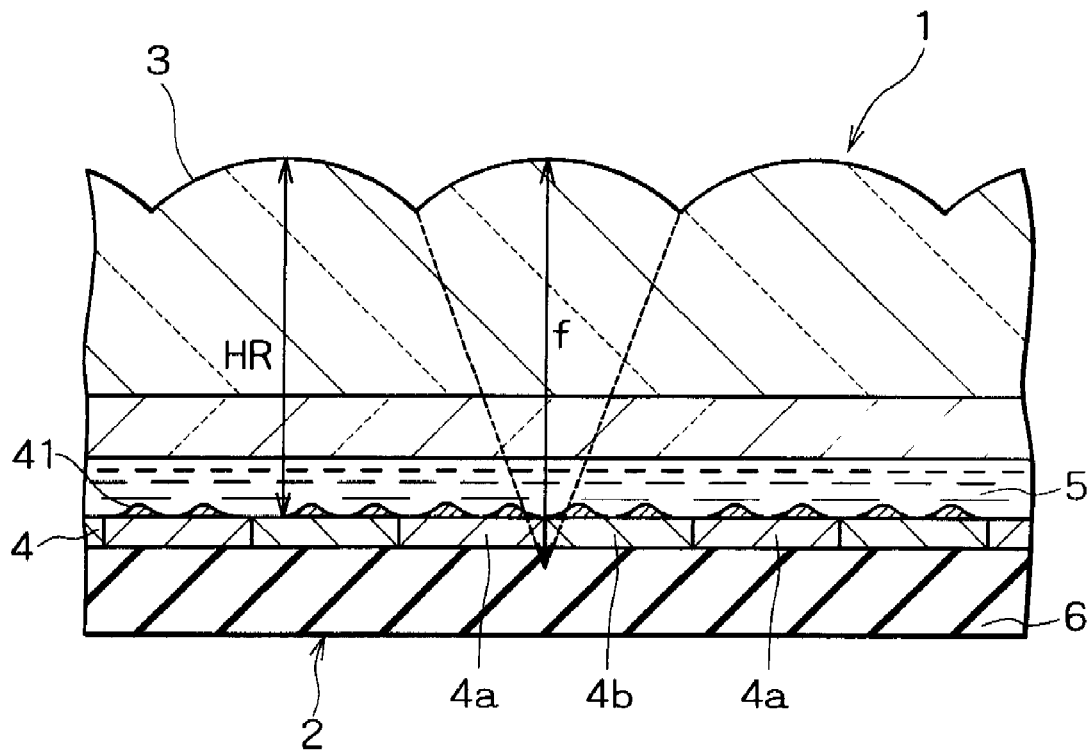
FIG. 19 is a sectional view of a three-dimensional image display device in a second embodiment of the invention.

FIG. 19 is a sectional view of a three-dimensional image display device in a second embodiment of the invention. The second embodiment is different from the first embodiment regarding the following point: The distance HR between the lens surface and the pixel in the second embodiment is designed to be smaller than the distance HR between the lens surface and the pixel in the conventional optical model determined by the above expressions 10 to 12. Accordingly, the distance HR between the lens surface and the pixel in the second embodiment is smaller than the focal distance f of the lenticular lens.

Figure 20:
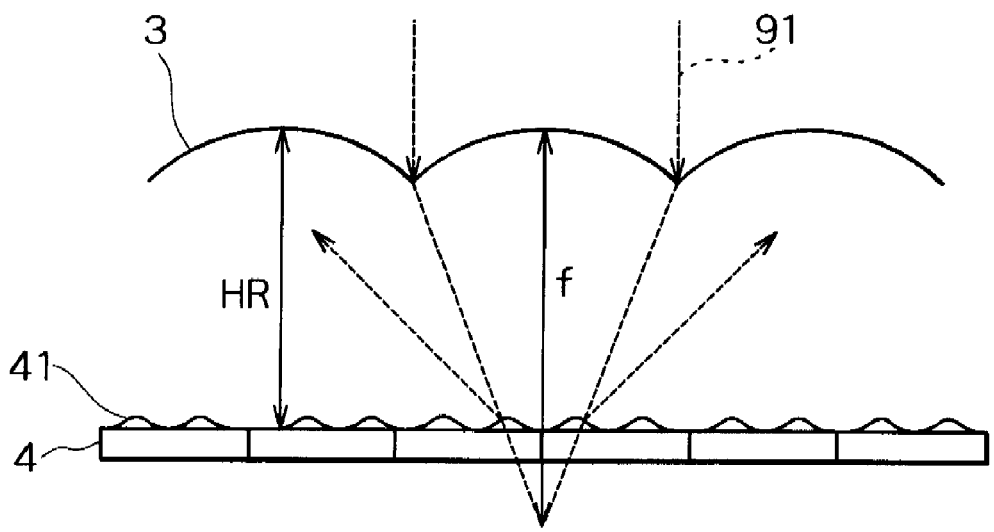
FIG. 20 is a ray diagram in the second embodiment of the invention where the light condensed by a lens illuminates a plurality of inclined surfaces.

Regarding the distance HR between the lens surface and the pixel in the second embodiment, it is particularly preferable that the light condensed by the lens illuminates inclined surfaces having different inclination angles, as shown in FIG. 20, because this arrangement provides a wider angular distribution for the reflected light, thus causing a greater amount of the reflected light to proceed toward the observer. Assuming that the pitch of surface projections is V, this condition can be expressed by the following expression 26 from the geometrical relationship of the distance HR between the lens surface and the pixel, the focal distance f and the lens pitch L:

$$V \leq (f-HR) \times L/f \quad \text{(Expression 26)}$$

$$HR/f \leq -V/L + 1 \quad \text{(Expression 27)}$$

Hence, it is preferable that the distance HR between the lens surface and the pixel is determined so as to fulfill the expression 27. In the case when the surface projections are randomly distributed, the present invention is applicable using the minimum pitch V of the surface projections.

In accordance with the second embodiment, the distance between the lens surface and the pixel can be further reduced, compared with that in the first embodiment. Since, therefore, the thickness of the three-dimensional image display device can be decreased, it can be used more suitably in a portable terminal, such as cellular phone or the like.

Third Embodiment

Figure 21:
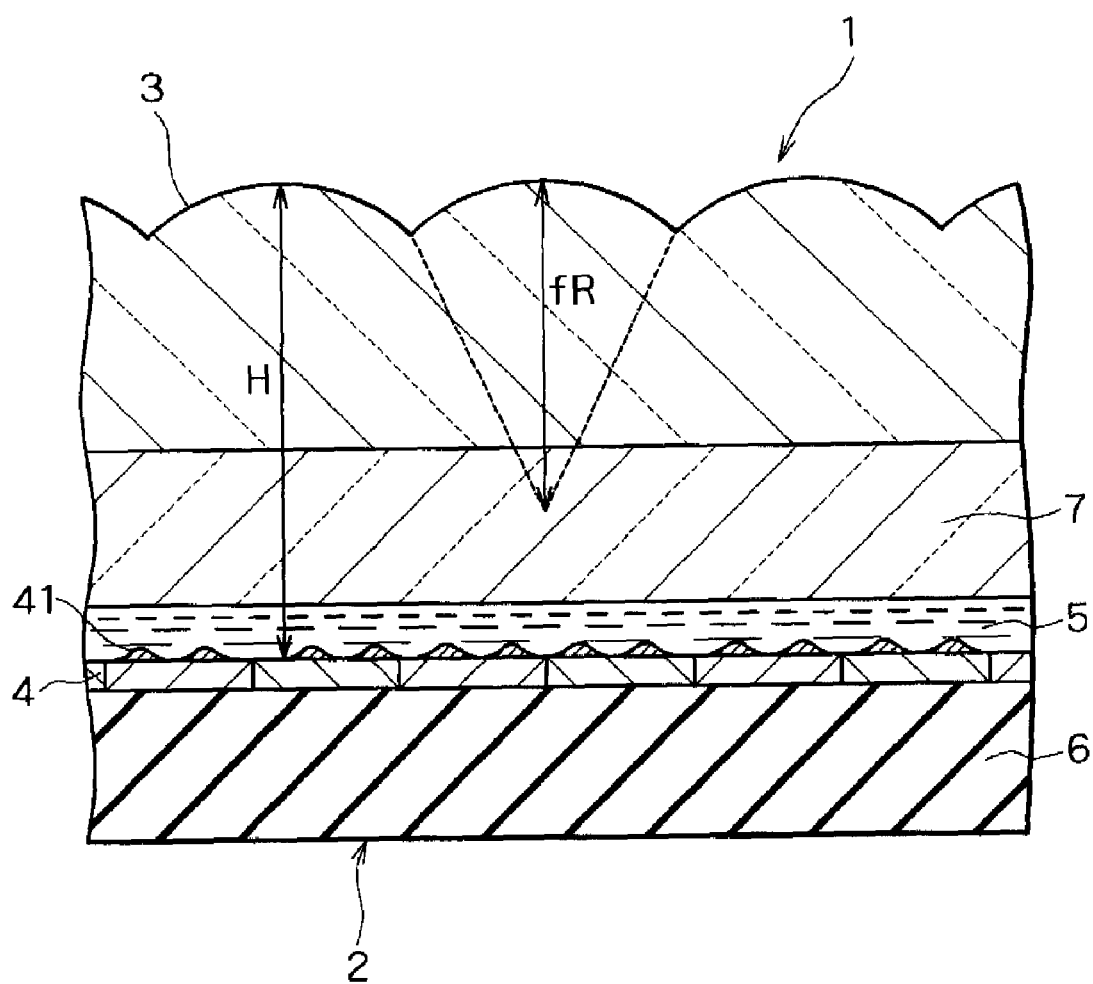
FIG. 21 is a sectional view of a three-dimensional image display device in a third embodiment of the invention.

FIG. 21 is a sectional view of a three-dimensional image display device in a third embodiment of the invention. The focal distance fR of the lenticular lens in the third embodiment is smaller than the focal distance f of the conventional optical model, calculated by the above expressions 10 to 12 and 16, compared with the first embodiment of the invention, and the distance H between the lens surface and the pixel is calculated by the above expressions 10 to 12.

Figure 22:
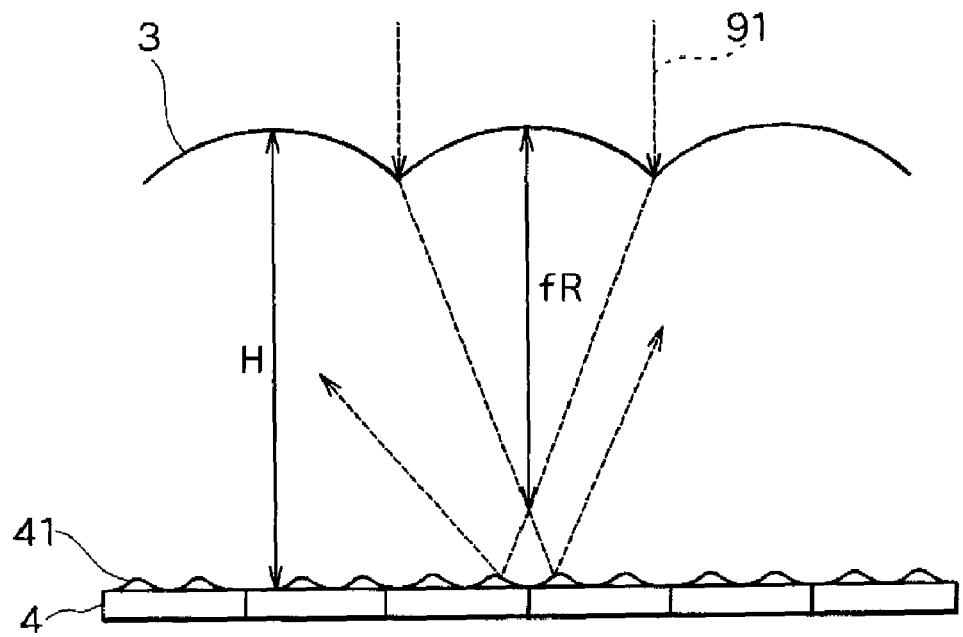
FIG. 22 is a ray diagram in the third embodiment of the invention where the light condensed by a lens illuminates a plurality of inclined surfaces.

Regarding the focal distance f in the third embodiment of the invention, it is particularly preferable that the light condensed by the lens illuminates inclined surfaces having different inclination angles, as shown in FIG. 22, because this arrangement provides a wider angular distribution for the reflected light, thus causing a greater amount of the reflected light to proceed toward the observer. Assuming that the pitch of surface projections is V, this condition can be expressed by the following expression 28 from the geometrical relationship of the distance H between the lens surface and the pixel, the focal distance fR and the lens pitch L, and the following expression 29 can be obtained by transforming the expression 28:

$$V \leq (H-fR) \times L/f \quad \text{(Expression 28)}$$

$$H/fR \geq V/L+1 \quad \text{(Expression 29)}$$

Hence, it is preferable that the focal distance fR of the lenticular lens is determined so as to fulfill the expression 29. In the case when the surface projections are randomly distributed, the present invention is applicable, using the minimum pitch V of the surface projections.

In the third embodiment, there is an advantage that the present invention is applicable even in the case the distance between the lens surface and the pixel is fixed, compared with the first embodiment. In the first embodiment, the distance H between the lens surface and the pixel is determined from the altered values fulfilling the expressions 1 to 9, and therefore it is necessary to change the other parameters, such as observing position OD and others in the stage of design. In the case of no change in the parameters, the three-dimensional image display device is not operated in the ideal state, thereby causing a negative influence, in which the three-dimensional visible range is shifted in a different magnitude between the central portion and the end portions of the display screen. In the third embodiment, the present invention can be achieved by altering only the focal distance f, and therefore no such problem takes place.

Fourth Embodiment

Figure 23:
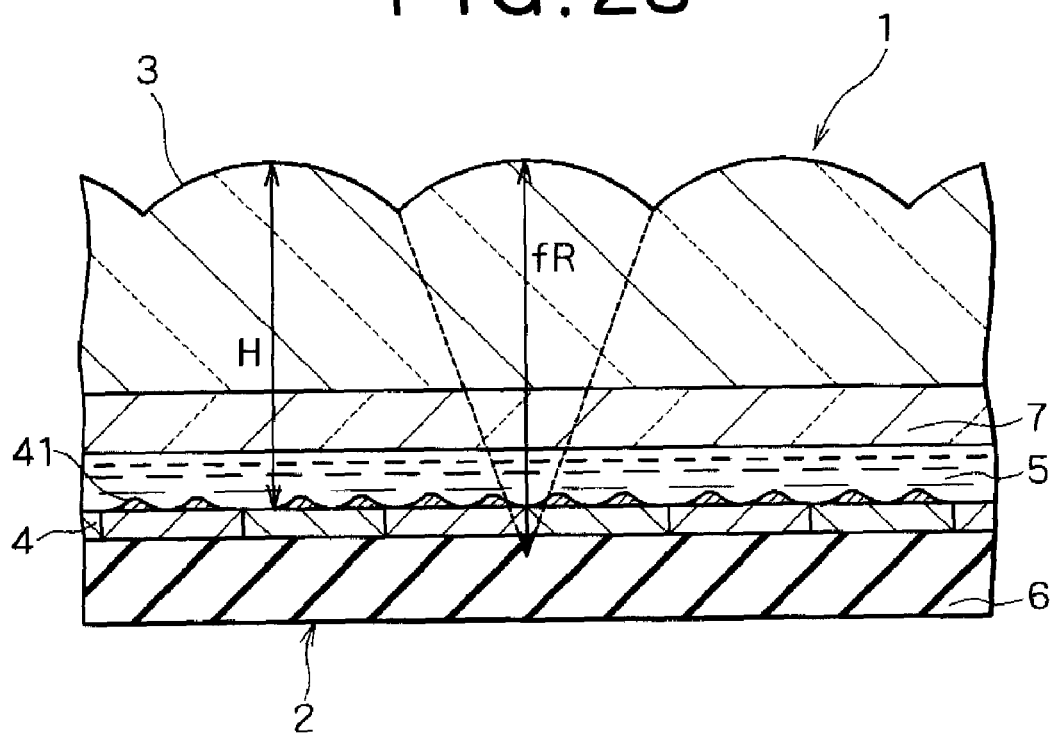
FIG. 23 is a sectional view of a three-dimensional image display device in a fourth embodiment of the invention.

FIG. 23 is a sectional view of a three-dimensional image display device in a fourth embodiment of the invention. The fourth embodiment is different from the third embodiment as for the following points: The focal distance fR of the lenticular lens is determined greater than the focal distance f calculated by the above expressions 10 to 12 and 16; and the distance H between the lens surface and the pixel is identical with a value which is determined by the expressions 10 to 12 in the conventional optical model.

Figure 24:
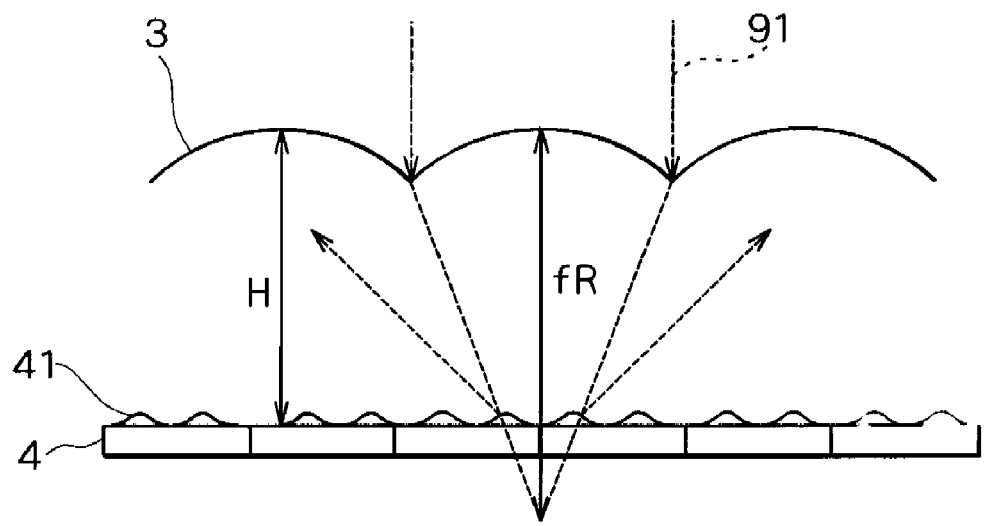
FIG. 24 is a ray diagram in the fourth embodiment of the invention where the light condensed by a lens illuminates a plurality of inclined surfaces.

Regarding the focal distance f in the fourth embodiment, it is particularly preferable that the light condensed by the lens illuminates inclined surfaces having different inclination angles, as shown in FIG. 24, because this arrangement provides a wider angular distribution for the reflected light, thus causing a greater amount of the reflected light to proceed toward the observer. Assuming that the pitch of surface projections is V, this condition can be expressed by the following expression 30 from the geometrical relationship of the distance H between the lens surface and the pixel, the focal distance fR and the lens pitch L, and the following expression 31 can be obtained by transforming the expression 30:

$$V \leq (fR-H) \times L/fR \quad \text{(Expression 30)}$$

$$H/fR \leq -V/L+1 \quad \text{(Expression 31)}$$

Hence, it is preferable that the focal distance fR of the lenticular lens is determined so as to fulfill the expression 31. In the case when the surface projections are randomly distributed, the present invention is applicable, using the minimum pitch V of the surface projections.

In the forth embodiment, there is an advantage that a larger value can be used for the focal distance fR, compared with the third embodiment. As a result, the height of the surface projections in the lenticular lens can be decreased, and therefore a noticeable unevenness can hardly be discerned on the surface of the lenticular lens, thereby enabling quality of the displayed three-dimensional image to be enhanced.

Fifth Embodiment

Figure 25:
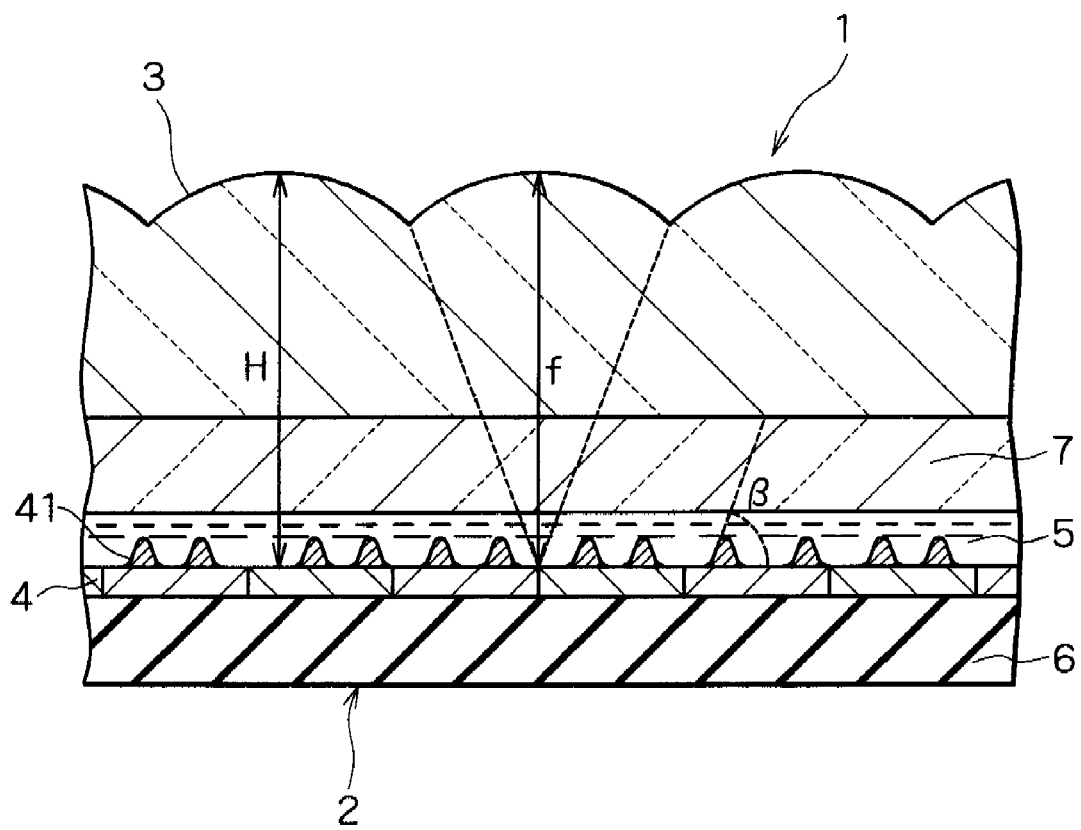
FIG. 25 is a sectional view of a three-dimensional image display device in a fifth embodiment of the invention.

FIG. 25 is a sectional view of a three-dimensional image display device in a fifth embodiment of the invention. The fifth embodiment is different from the first to fourth embodiments in the following points: The values determined by the above expressions 10 to 12 and 16 are used for the focal distance f and the distance H between the lens surface and the pixel, and the inclination angle θ of the surface projections is greater than 50°.

In order to investigate the specific feature of the three-dimensional image display device in the fifth embodiment, computer simulations were carried out, varying the inclination angle θ of the surface projections from 25° to 75°. FIGS. 26A to 26F show the results of the simulation. The result at θ=75° in FIG. 26A; the result at θ=65° in FIG. 26B; the result at θ=60° in FIG. 26C; the result at θ=50° in FIG. 26D; the result at θ=35° in FIG. 26E; and the result at θ=25° in FIG. 26F. It is found that a reduction in the brightness takes place at an observing position of approximately −30 mm when the inclination angle θ is smaller than 50°, whereas such a reduction is relieved at an inclination angle θ greater than 50°, i.e., no dark display appears even when observing it at the observing position of approximately −30 mm.

Figure 26A:
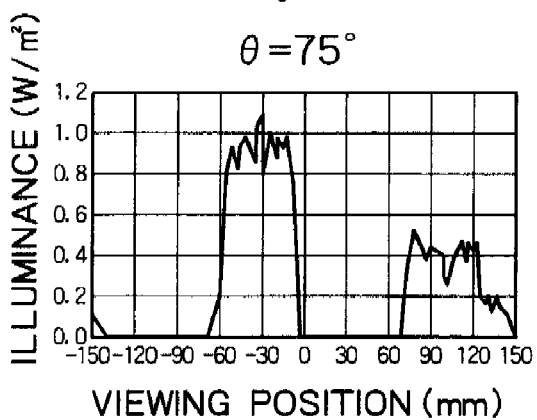
FIGS. 26A to 26F are diagrams showing the results of the computer simulation in the fifth embodiment of the invention.
Figure 26B:
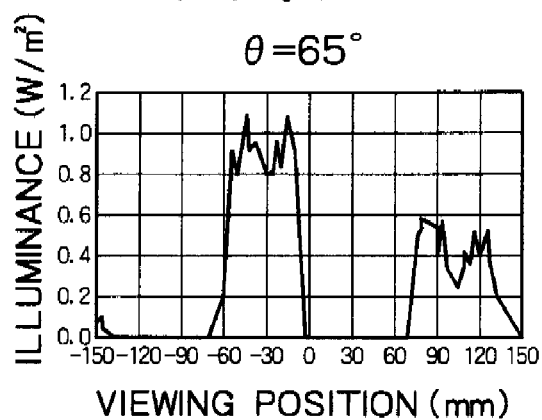
Figure 26C:
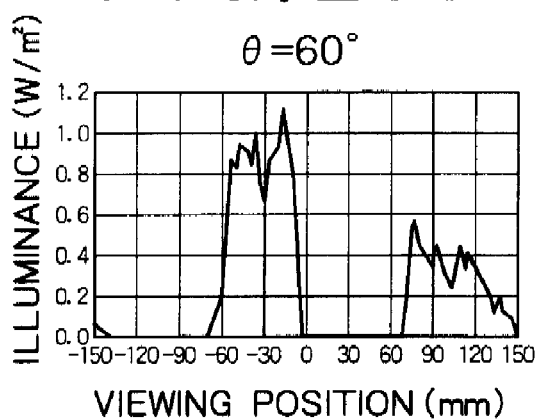
Figure 26D:
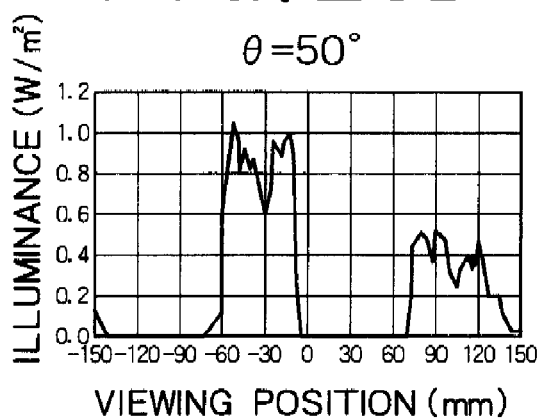
Figure 26E:
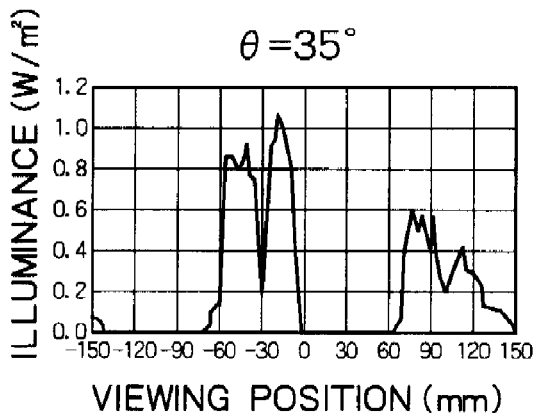
Figure 26F:
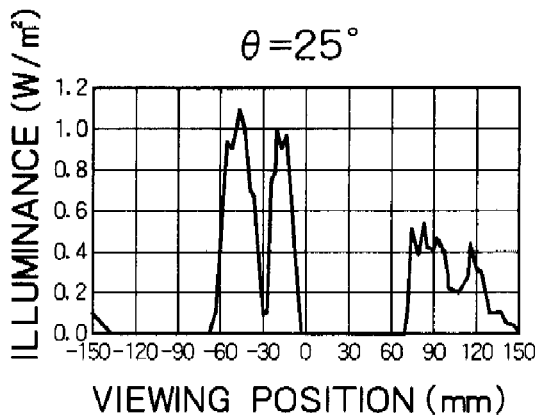
Figure 27A:
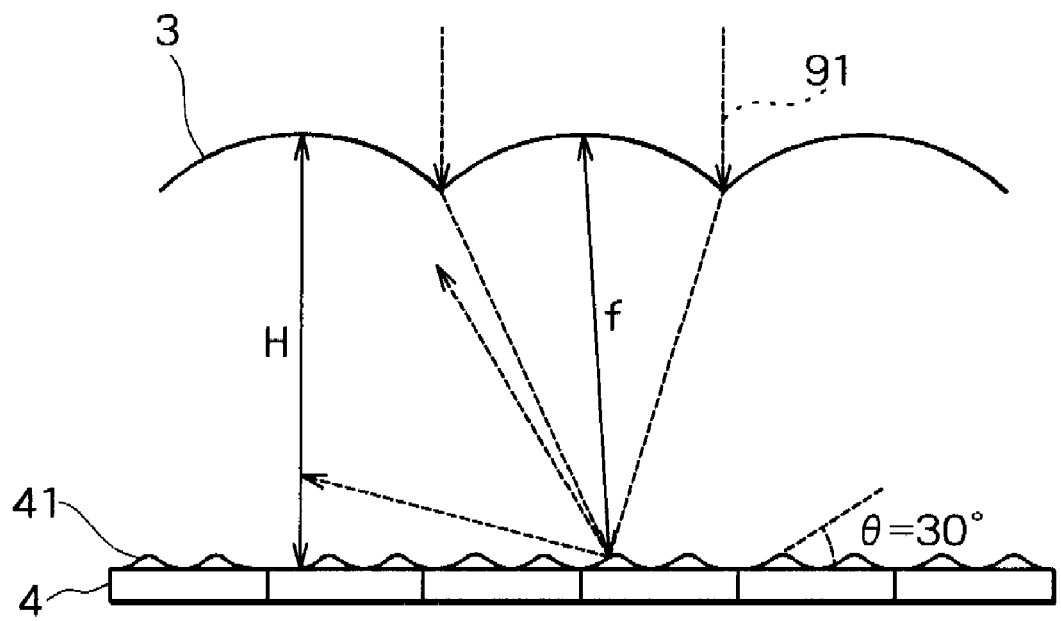
FIGS. 27A and 27B are conceptual ray diagrams for explaining the principle in the fifth embodiment of the invention.
Figure 27B:
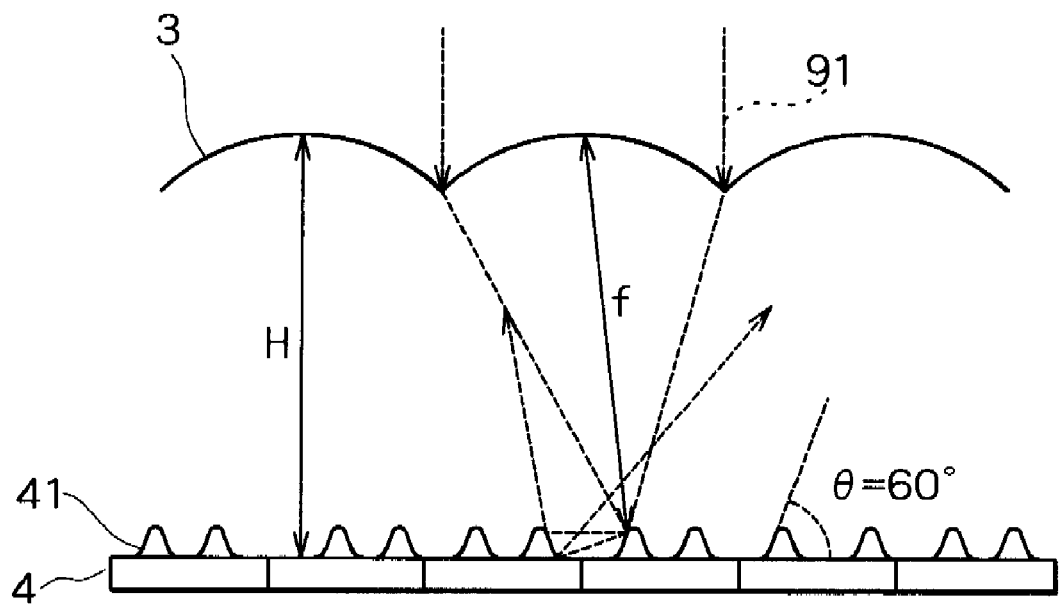

FIGS. 27A and 27B are conceptual ray diagrams for qualitatively describing the principle of the three-dimensional image display in the fifth embodiment. FIG. 27A is the conceptual ray diagram showing the trajectories of parallel light rays as for the incident light in the conventional optical model shown in FIG. 10. In this case, the distance H between the lens surface and the pixel is the same as the focal distance f, and the inclination angle of the surface projections is smaller than 50°, for example 30°. Therefore, the light condensed by the lens is reflected by the inclined surfaces of the surface projections and travels in the direction different from that toward an observer. Accordingly, the reflected light provides substantially no contribution to the display. On the contrary, the inclination angle of the surface projections is larger than 50°, for example 60° in the optical model according to the fifth embodiment, as shown in FIG. 26B. As a result, a part of the light reflected by an inclined surface of a surface projection is again reflected by another inclination surface, and then proceeds to the observer, thereby making it possible to suppress the brightness reduction due to the surface projections.

Sixth Embodiment

Figure 28:
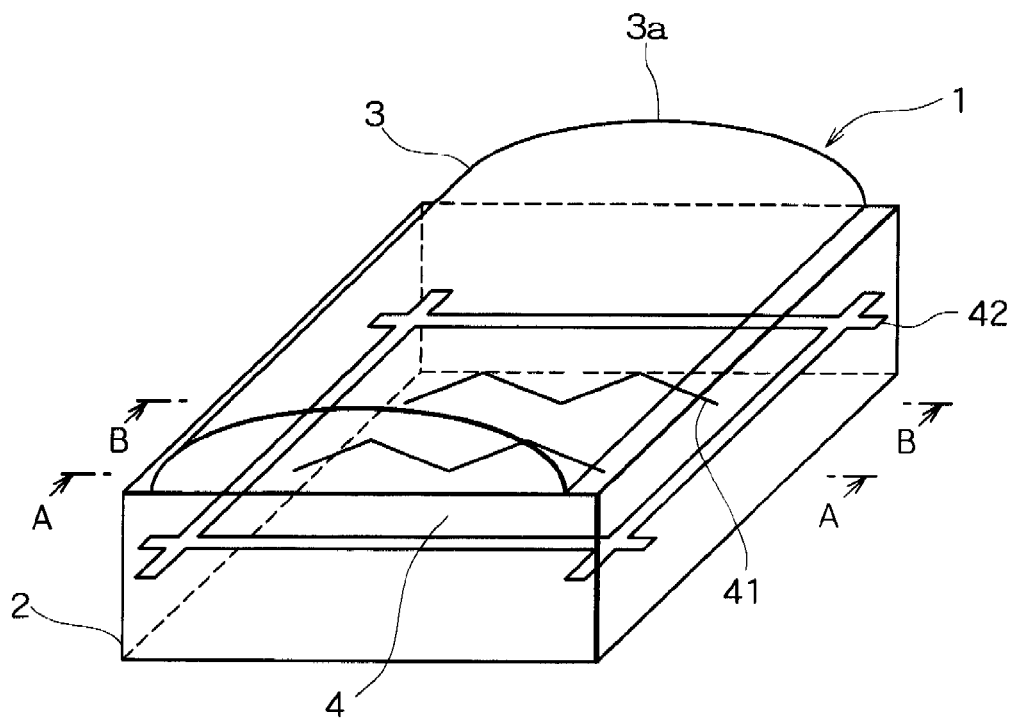
FIG. 28 is a perspective view showing a three-dimensional image display device in a sixth embodiment of the invention.
Figure 29A:
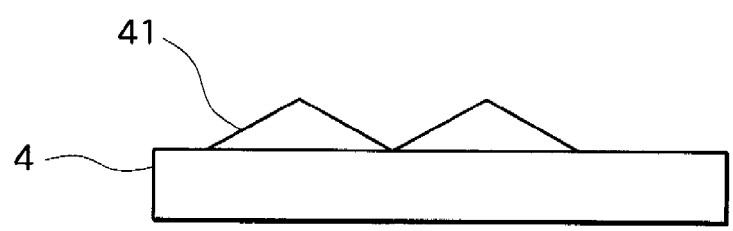
FIG. 29A is a cross-sectional view along line A-A in FIG. 28
Figure 29B:
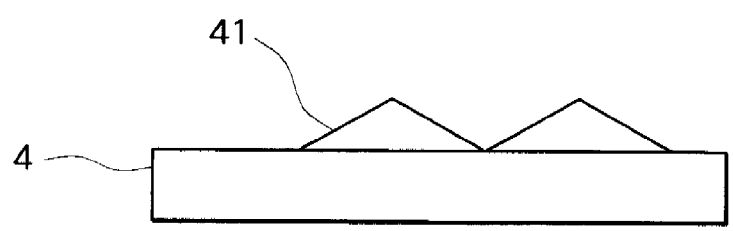
FIG. 29B is a cross-sectional view along line B-B in FIG. 28, both illustrating the principle of the sixth embodiment qualitatively.

The sixth embodiment of the invention will be described below. FIG. 28 is a perspective view showing a three-dimensional image display device in the sixth embodiment of the invention, and FIG. 29A is a cross-sectional view along line A-A in FIG. 28 and FIG. 29B is a cross-sectional view along line B-B in FIG. 28, both illustrating the principle of the sixth embodiment qualitatively. The three-dimensional image display device according to this embodiment differs from the image display devices according to the first to fifth embodiments in that in the array direction of the cylindrical lenses 3a constituting the lenticular lens 3, the probability of existence of an inclined surface having an inclination angle on the surface projections 41 is approximately uniform in one pixel. Further, the focal distance f of the lenticular lens 3 is equal to the distance H between the lens surface of the lenticular lens 3 and the pixel and the inclination angle of the surface projections 41 is 30°, for example.

In the cross section shown in FIGS. 29A and 29B, the surface projection 41 has two types of (positive and negative) inclination angles equal to each other in absolute value. The positions of the surface projections 41 in the array direction of the cylindrical lenses 3a are shifted from each other by half the pitch of the surface projections 41 or half the period. That is, the phase of the surface projections 41 in the area shown in FIG. 29A is shifted from the phase of the surface projections 41 in the area shown in FIG. 29B by half the period.

As the cylindrical lenses 3a do not have a lens effect in the longitudinal direction, the optical effect of the surface projections 41 is the result of integrating the effects of the cylindrical lenses 3a in the longitudinal direction. In the three-dimensional image display device shown in FIG. 28 and FIGS. 29A and 29B, therefore, the optical effect of the surface projections 41 is the effect of the surface projections 41 shown in FIG. 29A and the effect of the surface projections 41 shown in FIG. 29B superimposed on each other. As a result, in any position in the array direction of the cylindrical lenses 3a, there always are positive and negative inclination angles at any position in the longitudinal direction of the cylindrical lenses 3a. Therefore, the optical characteristic of the three-dimensional image display device according to the sixth embodiment becomes equivalent to that in the case where the same inclination angle is continuously set at all the positions in the array direction of the cylindrical lenses 3a.

In FIG. 28, there are four surface projections or two sets of surface projections each of which includes two surface projections and which are laid out in such a way as to be shifted by half the period from each other. Therefore, the probability that the inclined surface with the inclination angle is present at an arbitrary position in the array direction of the cylindrical lenses 3a is kept constant. This can more reliably prevent a reduction in brightness which would originate from the surface projections.

It is preferable that the surface projections 41 be laid out, shifted in the array direction of the cylindrical lenses 3a in such a way as to have a higher density in the longitudinal direction of the cylindrical lenses 3a. In case where the surface projections 41 are conical, for example, a plurality of cones may be laid out in a line in the array direction of the cylindrical lenses 3a and cones in an adjoining line come between the cones adjacent to one another in the array direction. This design can allow the pitch of the surface projections 41 in the longitudinal direction of the cylindrical lenses 3a to be smaller than the pitch of the surface projections 41 in the array direction of the cylindrical lenses 3a. Accordingly, the number of the surface projections 41 disposed in one pixel in the longitudinal direction of the cylindrical lenses 3a increases, so that the aforementioned integrated effect can make the reflected light more uniform. It therefore becomes easier to adapt the three-dimensional image display device in the sixth embodiment to a high-definition display panel having smaller pixel pitches.

The focal distance f of the lenticular lens 3 may be different from the distance H between the lens surface of the lenticular lens 3 and the pixel and the inclination angle of the surface projections 41 may be, for example, 50° or greater. Further, the three-dimensional image display device in the sixth embodiment may be a semi-transmissive image display device which has a reflection region and a transmission region provided in each pixel.

Seventh Embodiment

Figure 30:
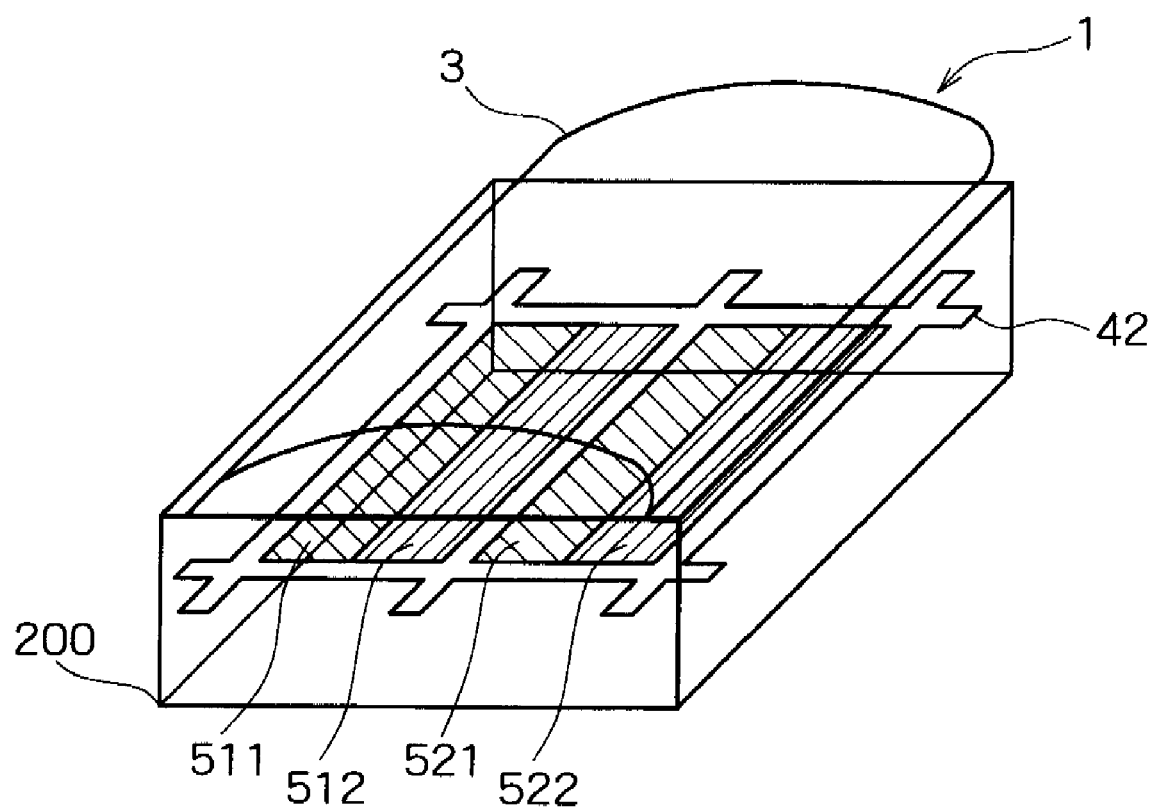
FIG. 30 is a schematic perspective view of a three-dimensional image display device in a seventh embodiment of the invention.

FIG. 30 is a perspective view of a three-dimensional image display device in a seventh embodiment of the invention. A display panel 200 for the three-dimensional image display device 1 in the sixth embodiment is a semi-transmissive display panel whose pixel electrodes having transmissive regions and reflective regions. In a concrete way, the pixel for the left eye consists of a pixel for the left eye (transmissive region) 511 and a pixel for the left eye (reflective region) 512, and similarly the pixel for the right eye consists of a pixel for the right eye (transmissive region) 521 and a pixel for the right eye (reflective region) 522. In this case, the pixel electrodes in both the pixel for the left eye (reflective region) 512 and the pixel for the right eye (reflective region) 522 are reflection plates, each of which is formed by an opaque layer such as metal electrode or the like, and the reflection plate has surface projections on the surface, as described above. The mutual relationship between the surface projections of the reflection plate and the lenticular lens 3 is similar to that in the first to fifth embodiments. Moreover, the pixel electrodes in both the pixel for the left eye (transmissive region) 511 and the pixel for the right eye (transmissive region) 521 are constituted by transparent electrodes made of ITO (Indium Tin Oxide). In conjunction with the above, a back light source (not shown) for the transmissive regions is disposed below the display panels.

In the three-dimensional image display device having such a structural arrangement according to the sixth embodiment, the light emitted from the back light source passes through the transmissive regions, and the natural light and/or the exterior light such as indoor illumination light is reflected by the reflective regions, so that both the transmission display and reflection display can be realized. As a result, a clear display can be achieved independent of the magnitude of brightness in the surroundings.

In the seventh embodiment, the semi-transmissive display panel is described. The present invention is also applicable to a transflective display panel, a micro reflective display panel or the like.

Eighth Embodiment

Figure 31:
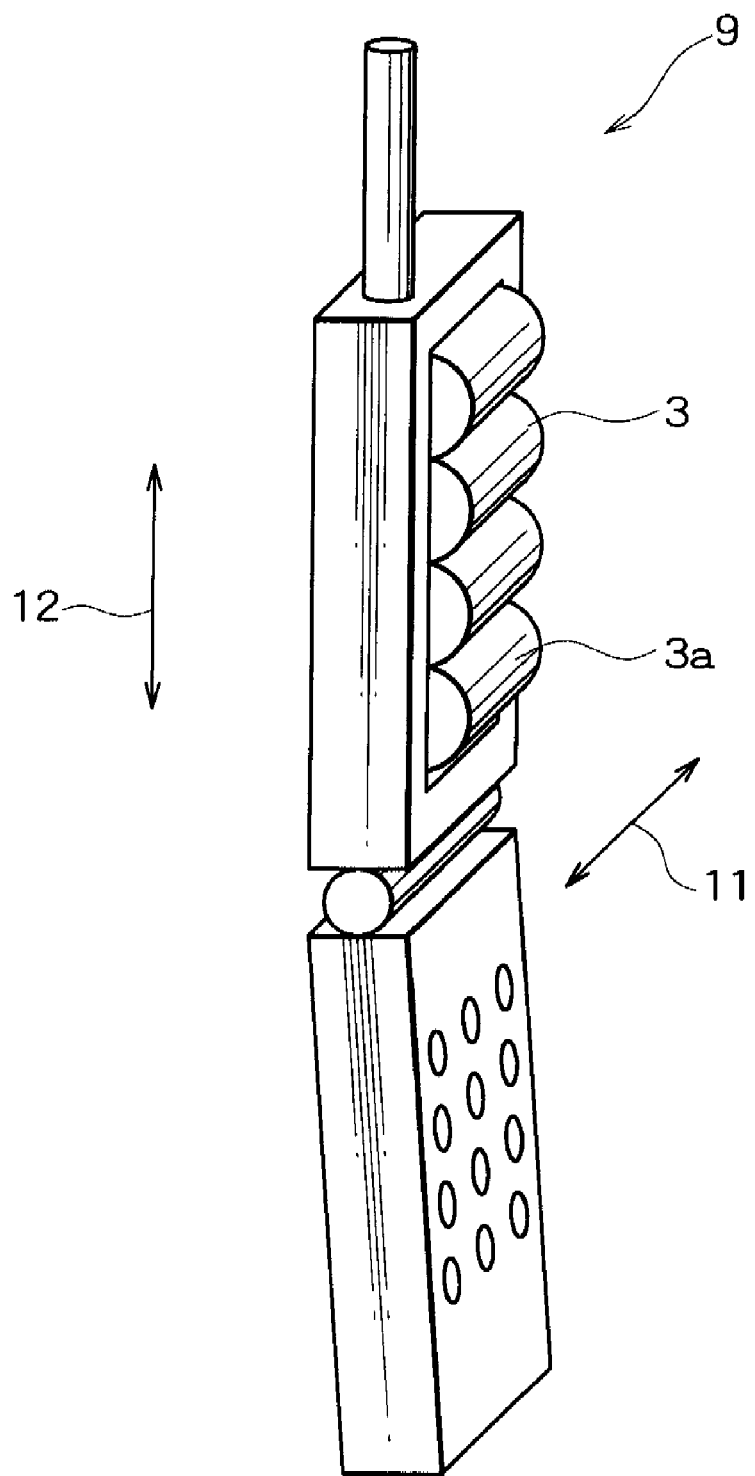
FIG. 31 is a perspective view of a portable terminal device in an eighth embodiment of the invention.
Figure 32:
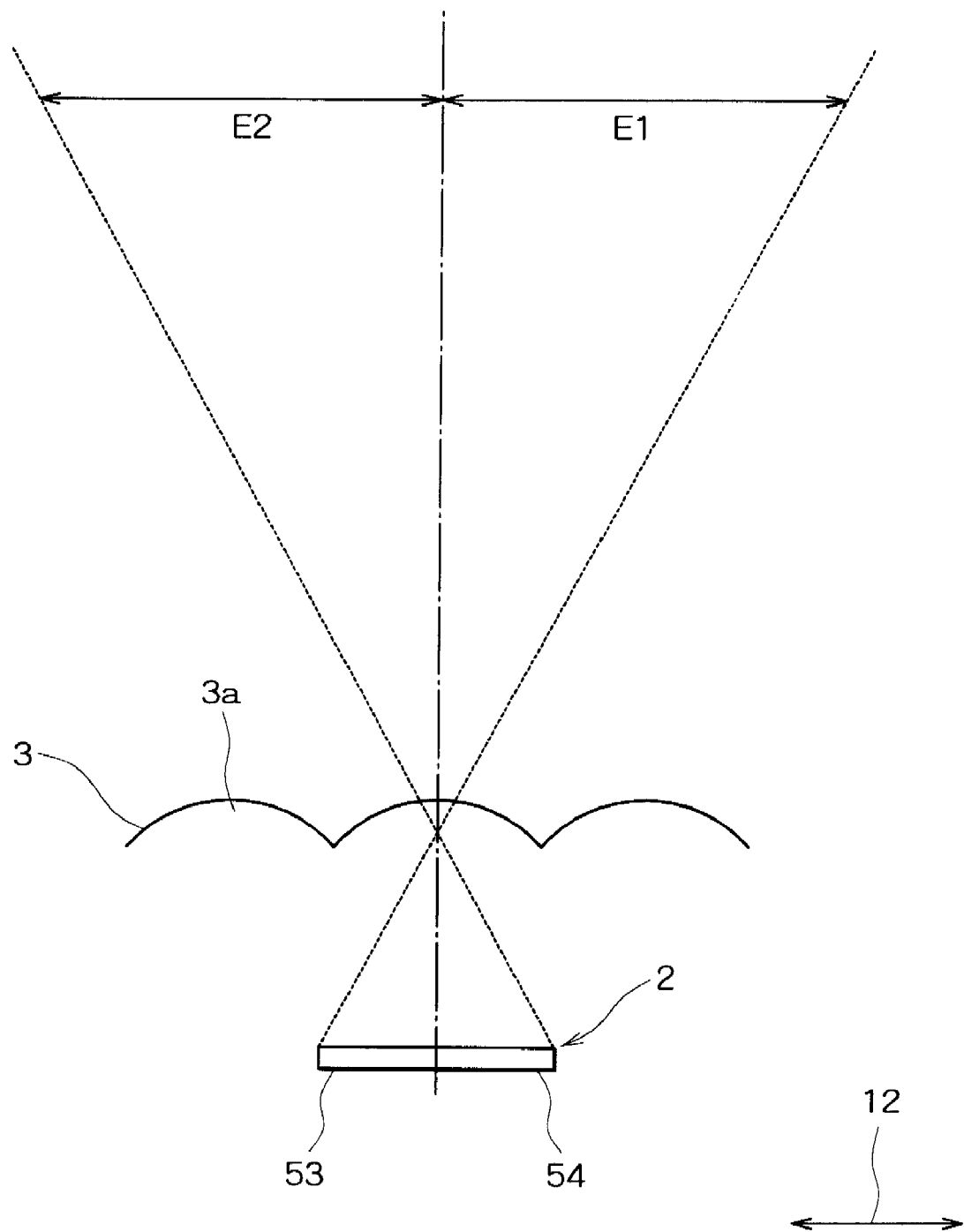
FIG. 32 is a diagram of the optical model illustrating the operation of an image display device in the eighth embodiment.

The eighth embodiment of the invention will be described below. FIG. 31 is a perspective view showing a portable terminal device in the eighth embodiment, and FIG. 32 is a diagram of the optical model illustrating the operation of an image display device in the embodiment. As shown in FIG. 31, an image display device is mounted in a cellular phone 9 as a portable terminal device. The eighth embodiment differs from the first embodiment in that the longitudinal direction 11 of the cylindrical lens 3a constituting the lenticular lens 3 is the lateral direction of the image display device or the horizontal direction of an image and the array direction 12 of the cylindrical lens 3a is the longitudinal direction or the vertical direction of an image. While FIG. 31 shows only four cylindrical lenses 3a to simplify the illustration, actually there are cylindrical lenses 3a equal in number to the pixels laid out in the longitudinal direction 11.

As shown in FIG. 32, plural pairs of pixels laid out on the display panel 2 in a matrix form, each comprised of a pixel 53 for the first viewpoint (hereinafter referred to as "first-viewpoint pixel 53") and a pixel 54 for the second viewpoint (hereinafter referred to as "second-viewpoint pixel 54"). The array direction of the first-viewpoint pixel 53 and the second-viewpoint pixel 54 in a single pixel pair is the array direction 12 of the cylindrical lens 3a or the longitudinal direction (vertical direction). The other structure of the eighth embodiment than those discussed above is the same as that of the first embodiment.

The operation of the image display device according to the embodiment will be described below. As shown in FIG. 32, the light source 10 emits light which enters the display panel 2. At this time, the first-viewpoint pixel 53 displays an image for the first viewpoint and the second-viewpoint pixel 54 displays an image for the second viewpoint. The image for the first viewpoint and the image for the second viewpoint are not a three-dimensional image having a parallax but two-dimensional images. While both images may be independent images, they may be images indicating information on correlation therebetween.

Exterior light, such as natural light or illumination light, transmits through the lenticular lens 3 from the front and enters the liquid crystal display panel 2. The light is reflected by the first-viewpoint pixel 53 and second-viewpoint pixel 54 and travels toward the lenticular lens 3. The lights reflected by the first-viewpoint pixel 53 and second-viewpoint pixel 54 are refracted by the cylindrical lenses 3a and are output toward areas E1 and E2. At this time, when an observer directs both eyes in the area E1, the observer can observe the image for the first viewpoint, whereas when the observer directs both eyes in the area E2, the observer can observe the image for the second viewpoint.

The eighth embodiment has such an advantage that by merely changing the angle of the cellular phone 9, the observer can direct both eyes to the area E1 or the area E2 to selectively observe the image for the first viewpoint or the image for the second viewpoint. In case where the image for the first viewpoint and the image for the second viewpoint have some correlation, particularly, the images can be switched from one to other for observation by the simple scheme of changing the observation angle, thereby improving the usability considerably. In case where the image for the first viewpoint and the image for the second viewpoint are laid out in the lateral direction, the right eye and left eye may see different images depending on the observation position. In this case, the observer may be confused and cannot identify the images for the individual viewpoints. In case where images for plural viewpoints are laid out in the longitudinal direction as done in the eighth embodiment, by way of contrast, the observer can always observe the images for the individual viewpoints with both eyes and can thus easily identify the images. The other advantages of the sixth embodiment are the same as those of the first embodiment. The eighth embodiment may be combined with any one of the second to seventh embodiments.

The foregoing descriptions of the first to eighth embodiments have been given of an image display device which is mounted in a portable telephone or so and supplies images having a parallax to the right and left eyes of a single observer to provide a three-dimensional image or simultaneously supply plural types of images to a single observer. However, the image display device according to the invention is not limited to this type but may be an image display device which has a large display panel and supplies plural different images to plural observers.

What is claimed is:

1. An image display device comprising:
    a display panel in which a plurality of pixel sections in the form of a matrix, each pixel section including at least a pixel for displaying an image for a first viewpoint and a pixel for displaying an image for a second viewpoint;
    a lens disposed in front of the display panel, said lens being constituted by a plurality of lens elements for refracting light emitted from each pixel to output the light in different directions; and
    a reflection plate disposed in said display panel or in the rear of said display panel, said reflection plate having surface projections on the surface thereof for reflecting the exterior light to said lens;
    wherein the focal distance f of said lens is the same as the distance H between the surface of said reflection plate and the apex of the lens, and
    wherein the surface projections on the surface of said reflection plate is designed in such a way that the light entering the three-dimensional image display device is reflected plural times.

2. An image display device according to claim 1, wherein the inclination angle of said surface projection is 50° or more.

3. An image display device according to claim 1, wherein said lens is a lenticular lens.

4. An image display device according to claim 1, wherein said lens is a fly-eye lens.

5. An image display device according to claim 1, wherein said image for said first viewpoint is an image for the left eye and said image for said second viewpoint is an image for the right eye which has a parallax with respect to said image for the right eye to thereby provide a three-dimensional image.

6. An image display device according to claim 1, wherein said display device is a liquid crystal display device.

7. A portable terminal device including a three-dimensional image display device according to claim 1.

8. An image display device according to claim 7, wherein said portable terminal device is a cellular phone, portable terminal, PDA, game machine, digital camera, or digital video camera.

9. An image display device comprising:
    a display panel which has a plurality of pixel sections provided in the form of a matrix, each pixel section including at least a pixel having a transmissive region and a reflective region for displaying an image for a first viewpoint and a pixel having a transmissive region and a reflective region for displaying an image for a second viewpoint;
    a lens disposed in front of the display panel, said lens being constituted by a plurality of lens elements for refracting light emitted from each pixel to output the light in different directions;
    a light source illuminating said transmissive region of said display panel with the light; and
    a reflection plate disposed in the reflective region of said display panel or in the rear of the reflective region of said display panel, said reflection plate having surface projections on the surface thereof for reflecting the exterior light to said lens;
    wherein a focal distance f of said lens is the same as a distance H between the surface of said reflection plate and the apex of the lens, and
    wherein the surface projections on the surface of said reflection plate is designed in such a way that the light entering the three-dimensional image display device is reflected plural times.

10. An image display device according to claim 9, wherein the inclination angle of said surface projection is 50° or more.

11. An image display device according to claim 9, wherein said lens is a lenticular lens.

12. An image display device according to claim 9, wherein said lens is a fly-eye lens.

13. An image display device according to claim 9, wherein said image for said first viewpoint is an image for the left eye and said image for said second viewpoint is an image for the right eye which has a parallax with respect to said image for the right eye to thereby provide a three-dimensional image.

14. An image display device according to claim 9, wherein said display device is a liquid crystal display device.

15. A portable terminal device including a three-dimensional image display device according to claim 9.

16. An image display device according to claim 15, wherein said portable terminal device is a cellular phone, portable terminal, PDA, game machine, digital camera, or digital video camera.

17. An image display device comprising:
- a display panel which has a plurality of pixel sections provided in the form of a matrix, each pixel section including at least a pixel for displaying an image for a first viewpoint and a pixel for displaying an image for a second viewpoint;
- a lenticular lens disposed in front of the display panel, said lenticular lens being constituted by a plurality of cylindrical lenses for refracting light emitted from each pixel to output the light in different directions; and
- a reflection plate disposed in said display panel or in the rear of said display panel, said reflection plate having surface projections on the surface thereof for reflecting exterior light to said lens;
- wherein a probability of existence of an inclined surface having an inclination angle on said surface projections is uniform in each of said pixels in an array direction of said cylindrical lenses.

18. An image display device according to claim 17, wherein a phase of said surface projections formed in one area of said pixels is shifted from a phase of said surface projections formed in another area of said pixels in said array direction of said cylindrical lenses.

19. An image display device according to claim 18, wherein a shift of said phase is a half the pitch of said surface projections.

20. An image display device according to claim 17, wherein the pitch of said surface projections in a longitudinal direction of said cylindrical lenses is smaller than the pitch of said surface projections in the array direction of said cylindrical lenses.

21. An image display device according to claim 17, wherein said image for said first viewpoint is an image for the left eye and said image for said second viewpoint is an image for the right eye which has a parallax with respect to said image for the right eye to thereby provide a three-dimensional image.

22. An image display device according to claim 17, wherein said display device is a liquid crystal display device.

23. A portable terminal device including a three-dimensional image display device according to claim 17.

24. An image display device according to claim 23, wherein said portable terminal device is a cellular phone, portable terminal, PDA, game machine, digital camera, or digital video camera.

25. An image display device comprising:
- a display panel which has a plurality of pixel sections provided in the form of a matrix, each pixel section including at least a pixel having a transmissive region and a reflective region for displaying an image for a first viewpoint and a pixel having a transmissive region and a reflective region for displaying an image for a second viewpoint;
- a lenticular lens disposed in front of the display panel, said lens being constituted by a plurality of cylindrical lenses for refracting light emitted from each pixel to output the light in different directions;
- a light source illuminating the transmissive region of said display panel with the light; and
- a reflection plate disposed in the reflective region of said display panel or in the rear of the reflective region of said display panel, said reflection plate having surface projections on the surface thereof for reflecting exterior light to said lens;
- wherein a probability of existence of an inclined surface having an inclination angle on said surface projections is uniform in each of said pixels in an array direction of said cylindrical lenses.

26. An image display device according to claim 25, wherein a phase of said surface projections formed in one area of said pixels is shifted from a phase of said surface projections formed in another area of said pixels in said array direction of said cylindrical lenses.

27. An image display device according to claim 26, wherein a shift of said phase is a half the pitch of said surface projections.

28. An image display device according to claim 25, wherein the pitch of said surface projections in a longitudinal direction of said cylindrical lenses is smaller than the pitch of said surface projections in the array direction of said cylindrical lenses.

29. An image display device according to claim 25, wherein said image for said first viewpoint is an image for the left eye and said image for said second viewpoint is an image for the right eye which has a parallax with respect to said image for the right eye to thereby provide a three-dimensional image.

30. An image display device according to claim 25, wherein said display device is a liquid crystal display device.

31. A portable terminal device including a three-dimensional image display device according to claim 25.

32. An image display device according to claim 31, wherein said portable terminal device is a cellular phone, portable terminal, PDA, game machine, digital camera, or digital video camera.

* * * * *